(12) United States Patent
Kato et al.

(10) Patent No.: US 12,475,194 B2
(45) Date of Patent: Nov. 18, 2025

(54) METHOD AND APPARATUS FOR TRAINING MACHINE LEARNING MODEL USING DISCRETIZATION

(71) Applicant: FUJITSU LIMITED, Kawasaki (JP)

(72) Inventors: Takashi Kato, Setagaya (JP); Keisuke Goto, Kawasaki (JP); Kotaro Ohori, Chuo (JP)

(73) Assignee: FUJITSU LIMITED, Kawasaki (JP)

( * ) Notice: Subject to any disclaimer, the term of this patent is extended or adjusted under 35 U.S.C. 154(b) by 901 days.

(21) Appl. No.: 17/697,670

(22) Filed: Mar. 17, 2022

(65) Prior Publication Data

US 2022/0207302 A1 Jun. 30, 2022

Related U.S. Application Data

(63) Continuation of application No. PCT/JP2019/040906, filed on Oct. 17, 2019.

(51) Int. Cl.
*G06F 18/214* (2023.01)
*G06F 18/24* (2023.01)
*G06N 20/00* (2019.01)

(52) U.S. Cl.
CPC .... *G06F 18/2148* (2023.01); *G06F 18/24765* (2023.01); *G06N 20/00* (2019.01)

(58) Field of Classification Search
CPC .......... G06F 18/2148; G06F 18/24765; G06N 20/00
See application file for complete search history.

(56) References Cited

U.S. PATENT DOCUMENTS

2019/0133480 A1 5/2019 Rahman et al.

FOREIGN PATENT DOCUMENTS

| CN | 108444708 A | * 8/2018 | .......... G01M 13/045 |
| CN | 110297469 | 10/2019 | |

(Continued)

OTHER PUBLICATIONS

Grzymala-Busse et al., "Three Discretization Methods for Rule Induction," International Journal of Intelligent Systems, vol. 16, pp. 29-38, 2001 (Year: 2001).*

(Continued)

*Primary Examiner* — Eric J. Bycer
(74) *Attorney, Agent, or Firm* — Fujitsu Intellectual Property Center

(57) ABSTRACT

With respect to training data records in which combinations of data item values of data items are individually associated with label information, the data item values are converted based on a criterion per data item into discretized data values. Training processing for training a model that receives the discretized data values as input and performs determination about the label information is performed by using training data records obtained by the conversion. From an execution result of the training processing, feature data records, each of which differently indicates a combination of two or more data items for the determination among the data items, and index values, which indicate importance levels of the feature data records respectively, are acquired. The criterion for the discretization of the data item values is changed based on at least one of the feature data records having been selected based on the index values.

8 Claims, 18 Drawing Sheets

(56) References Cited

FOREIGN PATENT DOCUMENTS

| CN | 110297469 A | * | 10/2019 | ....... G05B 19/41875 |
|---|---|---|---|---|
| CN | 108444708 | | 2/2021 | |
| WO | WO-2016121053 A1 | * | 8/2016 | ............... G06N 7/00 |
| WO | WO-2018059016 A1 | * | 4/2018 | ............. G06F 17/18 |

OTHER PUBLICATIONS

Kotsiantis et al., "Discretization Techniques: A recent survey," GESTS International Transactions on Computer Science and Engineering, vol. 32 (1), 2006, pp. 47-58. (Year: 2006).*
Kononenko et al., "Machine Learning and Data Mining: Introduction to Principles and Algorithms," Horwood Publishing, 2007, Ch, 7, pp. 181-211. (Year: 2007).*
Muhlenbach et al., "Discretization of Continuous Attributes," Encyclopedia of Data Warehousing and Mining, Idea Group Reference, 2009, pp. 397-402. (Year: 2009).*
Chen et al., "Learning Discrete Bayesian Networks from Continuous Data," Journal of Artificial Intelligence Research 59, pp. 103-132. (Year: 2017).*
EPOA—European Patent Office Action dated Jul. 30, 2024 for corresponding European Application No. 19949449.3, 12 pages.
Kazutoshi Hirose et al: "Quantization Error-Based Regularization in Neural Networks", Nov. 21, 2017 (Nov. 21, 2017), SAT 2015 18th International Conference, Austin, TX, USA, Sep. 24-27, 2015; [Lecture Notes in Computer Science; Lect.Notes Computer], Springer, Berlin, Heidelberg, pp. 137-142, XP047455916, ISBN: 978-3-540-74549-5 [retrieved on Nov. 21, 2017].
Hanhirova Jussi et al: "A machine learning based quality control system for power cable manufacturing", 2019 IEEE 17th International Conference on Industrial Informatics (INDIN), IEEE, vol. 1, Jul. 22, 2019 (2019), pp. 193-198, XP033700918, DOI: 10.1109/INDIN41052.2019.8972281 [retrieved on Jan. 27, 2020].
Usama M. Fayyad et al., "Multi-Interval Discretization of Continuous-Valued Attributes for Classification Learning", Proceedings of the 13th International Joint Conference on Artificial Intelligence (IJCAI-93), Aug. 28-Sep. 3, 1993, pp. 1022-1027 (Total 6 pages).
Stephen D. Bay, "Multivariate Discretization of Continuous Variables for Set Mining", Proceedings of the sixth ACM SIGKDI International Conference on Knowledge Discovery and Data Mining, Aug. 2000, pp. 315-319 (Total 5 pages) (Cited in ISR).
International Search Report and Written Opinion of the International Searching Authority (Form PCT/ISA/210 and 237), mailed in connection with PCT/JP2019/040906 and mailed Dec. 17, 2019 (Total 8 pages).
Japanese Office Action mailed Apr. 25, 2023 for corresponding Japanese Patent Application No. 2021-552063, with English Translation, 8 pages.
Japanese Office Action mailed Sep. 26, 2023 for corresponding Japanese Patent Application No. 2021-552063, with English Translation, 8 pages.
Extended European Search Report dated Sep. 28, 2022 for corresponding European Application No. 19949449.3, 11 pages.
CNOA—Chinese Patent Office Action dated Aug. 19, 2025 for corresponding Chinese Application No. 201980101036.X, with English translation.

* cited by examiner

TRAINING DATA TABLE                                    131

| ID | TEMPERA-TURE | CHEMICAL DOSAGE | ... | DEFECTIVE PRODUCT |
|---|---|---|---|---|
| 1 | 36 | 28 | ... | 1 |
| 2 | 35 | 35 | ... | 1 |
| 3 | 31 | 27 | ... | 0 |
| 4 | 34 | 97 | ... | 1 |
| 5 | 10 | 59 | ... | 0 |
| 6 | 15 | 21 | ... | 0 |
| 7 | 29 | 121 | ... | 1 |
| 8 | 16 | 67 | ... | 0 |
| 9 | 22 | 71 | ... | 0 |
| 10 | 26 | 18 | ... | 0 |
| ... | ... | ... | ... | ... |

FIG. 3

TRAINING DATA TABLE — 132

| ID | TEMPERA-TURE | SECTION 1 | SECTION 2 | SECTION 3 | CHEMICAL DOSAGE | SECTION 4 | SECTION 5 | SECTION 6 | ... | DEFECTIVE PRODUCT |
|---|---|---|---|---|---|---|---|---|---|---|
| 1 | 36 | 0 | 0 | 1 | 28 | 0 | 1 | 0 | ... | 1 |
| 2 | 35 | 0 | 0 | 1 | 35 | 0 | 1 | 0 | ... | 1 |
| 3 | 31 | 0 | 0 | 1 | 27 | 1 | 0 | 0 | ... | 0 |
| 4 | 34 | 0 | 0 | 1 | 97 | 0 | 1 | 0 | ... | 1 |
| 5 | 10 | 1 | 0 | 0 | 59 | 0 | 1 | 0 | ... | 0 |
| 6 | 15 | 1 | 0 | 0 | 21 | 1 | 0 | 0 | ... | 0 |
| 7 | 29 | 0 | 1 | 0 | 121 | 0 | 0 | 1 | ... | 1 |
| 8 | 16 | 1 | 0 | 0 | 67 | 0 | 1 | 0 | ... | 0 |
| 9 | 22 | 0 | 1 | 0 | 71 | 0 | 1 | 0 | ... | 0 |
| 10 | 26 | 0 | 1 | 0 | 18 | 1 | 0 | 0 | ... | 0 |
| ... | ... | ... | ... | ... | ... | ... | ... | ... | ... | ... |

FIG. 4

CHUNK TABLE

| EXPLANATORY VARIABLE | IMPORTANCE LEVEL |
|---|---|
| VARIABLE A ≥ 3 ∧ VARIABLE B ≥ 4 | 2.33 |
| VARIABLE C ≥ 3 ∧ VARIABLE D ≥ 4 | 1.18 |
| VARIABLE A ≤ 0.2 ∧ VARIABLE B ≥ 3 | 0.92 |
| VARIABLE A ≤ 0.2 ∧ VARIABLE B ≥ 1 | 0.86 |
| VARIABLE A ≤ 2 ∧ VARIABLE D ≤ 2 | 0.77 |
| VARIABLE A ≤ 0.2 ∧ VARIABLE D ≤ 0.1 | 0.63 |
| ... | ... |

134

IMPORTANCE LEVEL TABLE 135

| VARIABLE SETS | IMPORTANCE LEVEL |
|---|---|
| (A, B) | 2.33 |
| (C, D) | 1.18 |
| (A, D) | 0.77 |

APPEARANCE NUMBER TABLE 136

| VARIABLE SETS | APPEARANCE NUMBER |
|---|---|
| (A, B) | 3 |
| (A, D) | 2 |
| (C, D) | 1 |

TARGET VARIABLE TABLE 137

| VARIABLE SETS |
|---|
| (A, B) |
| (C, D) |

FIG. 8

VERIFICATION RESULT TABLE  ⟵ 171

| TECHNIQUE | abalone | | wine | |
|---|---|---|---|---|
| | RF | WL | RF | WL |
| cut | 0.670 | 0.670 | 0.654 | 0.644 |
| qcut | 0.768 | 0.782 | 0.724 | 0.692 |
| mdlp | 0.775 | 0.790 | 0.752 | 0.733 |
| mmdlpAll | 0.760 | 0.751 | 0.692 | 0.689 |
| count_max | 0.793 | 0.795 | 0.750 | 0.753 |
| weight(abs)_max | 0.807 | 0.794 | 0.761 | 0.753 |

FIG. 17

METHOD AND APPARATUS FOR TRAINING MACHINE LEARNING MODEL USING DISCRETIZATION

CROSS-REFERENCE TO RELATED APPLICATION

This application is a continuation application of International Application PCT/JP2019/040906 filed on Oct. 17, 2019 which designated the U.S., the entire contents of which are incorporated herein by reference.

FIELD

The present invention relates to a machine learning method and a machine learning apparatus.

BACKGROUND

There are cases where machine learning is performed as a large-scale data analysis using a computer. In machine learning, a plurality of samples indicating known cases are inputted to a computer. The computer analyzes the plurality of samples and trains a model that generalizes a relationship between a factor (which may be referred to as an explanatory variable or an independent variable) and a result (which may be referred to as an objective variable or a dependent variable). By using this trained model, it is possible to predict results of unknown cases.

To improve the accuracy of such a model, there are cases where pre-processing is performed on training data before machine learning is performed. One example of the pre-processing is "discretization", which is performed to reduce the number of possible values of an explanatory variable. In the discretization, an explanatory variable expressed by "continuous values", which may take on a large number of values, is converted into an explanatory variable expressed by "discrete values", which may take on a small number of values. In the discretization, for example, the range of these continuous values is divided into a plurality of sections, and discrete values are individually assigned to the sections with respect to the continuous values.

There has been proposed entropy-based discretization in which a plurality of sections for discretizing an explanatory variable are dynamically determined in view of a correspondence relationship between the values of the explanatory variable and the values of an objective variable. In the entropy-based discretization, a section in which samples having the same objective variable value densely exist is detected from a distribution of the explanatory variable values included in training data. By discretizing the explanatory variable in view of the distribution of the objective variable values, improvement of the model accuracy is expected. See, for example, the following document.

Usama M. Fayyad and Keki B. Irani, "Multi-Interval Discretization of Continuous-Valued Attributes for Classification Learning", Proceedings of the 13th International Joint Conference on Artificial Intelligence (IJCAI-93), pp. 1022-1027, 1993-08-28.

SUMMARY

In one aspect, there is provided a non-transitory computer-readable recording medium storing therein a computer program that causes a computer to execute a process including: discretizing, with respect to a plurality of training data records, each of which is data in which a combination of data item values of a plurality of data items is associated with label information, the data item values based on a criterion per data item to convert the data item values into discretized data values; performing training processing for training a model that receives the discretized data values of the plurality of data items as input and performs determination about the label information by using a plurality of training data records obtained by conversion; acquiring, from an execution result of the training processing, a plurality of feature data records, each of which differently indicates a combination of two or more data items used for the determination among the plurality of data items and a plurality of index values, each of which indicates an importance level of an individual one of the plurality of feature data records; and selecting at least one of the plurality of feature data records based on the plurality of index values and changing the criterion used for the discretizing of the data item values based on the at least one of the plurality of feature data records selected.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example of a training data table.

FIG. 4 illustrates an example of a training data table obtained after pre-processing.

FIG. 8 illustrates an example of selection of explanatory variable sets used for discretization.

FIG. 17 illustrates an effect verification result.

DESCRIPTION OF EMBODIMENTS

According to the conventional discretization technique applied to training data, the discretization is performed per explanatory variable, and the discretization method for discretizing a certain explanatory variable is determined independently of the discretization method for discretizing another explanatory variable. For example, the method for dividing the range of continuous values of a certain explanatory variable is determined independently of the method for dividing the range of continuous values of another explanatory variable.

From the viewpoint of improvement of the model accuracy, there is room for improvement of the discretization performed as the pre-processing on the training data. For example, there are cases where, if a distribution of objective variable values is taken into consideration with a combination of two or more explanatory variables, better cutoff points could be set for each of the two or more explanatory variables. In these cases, it is a problem to select such a combination of explanatory variables from various explanatory variables included in the training data to perform the discretization processing.

Hereinafter, embodiments will be described with reference to the accompanying drawings.

First Embodiment

A first embodiment will be described.

Figure 1:
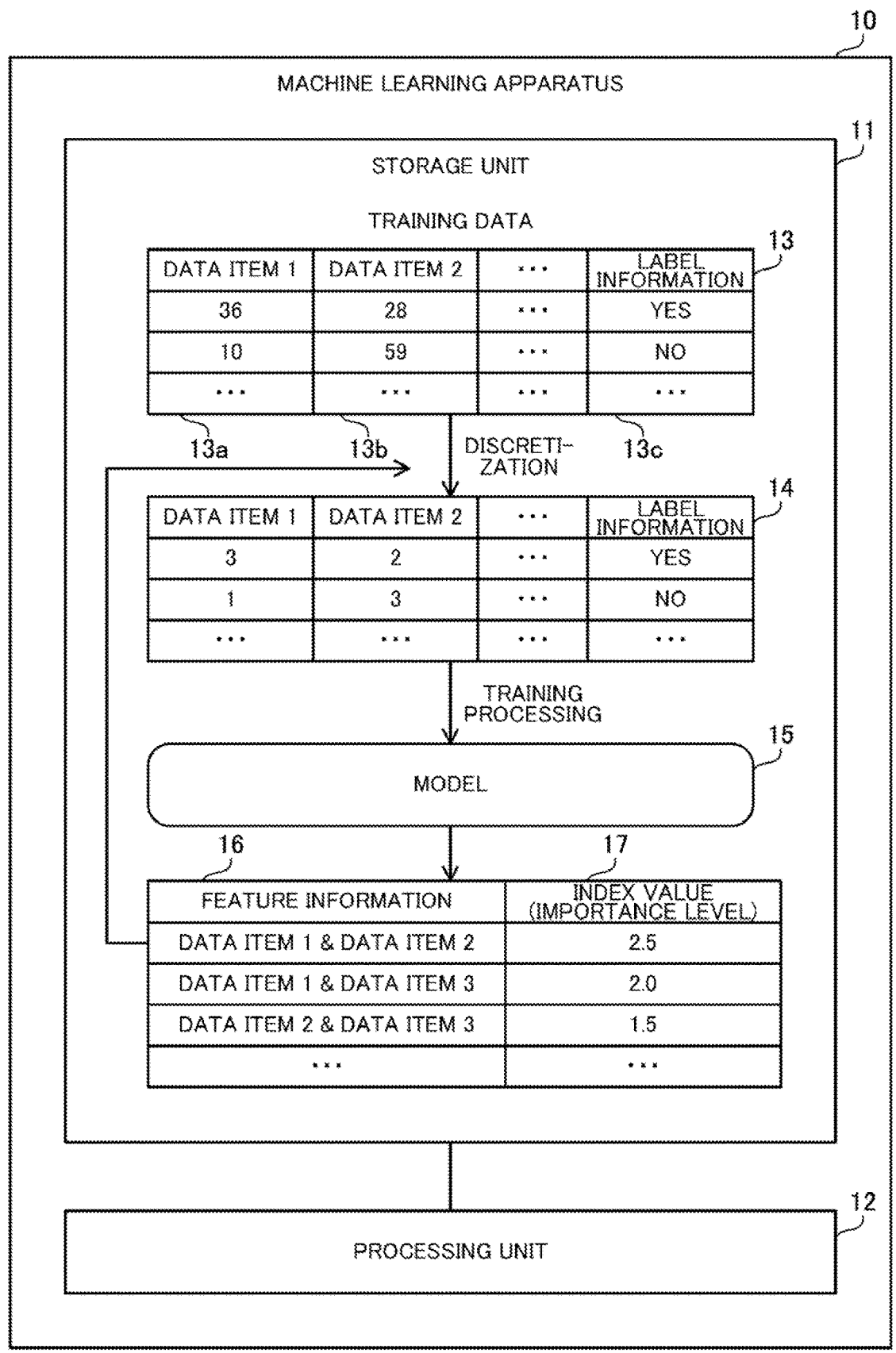
FIG. 1 illustrates an example of a machine learning apparatus according to a first embodiment.

FIG. 1 illustrates an example of a machine learning apparatus according to a first embodiment.

This machine learning apparatus 10 according to the first embodiment performs pre-processing on training data, performs machine learning by using the pre-processed training data, and trains a model for predicting unknown results. The machine learning apparatus 10 may be a client apparatus or a server apparatus. The machine learning apparatus 10 may be referred to as a computer or an information processing apparatus.

The machine learning apparatus 10 includes a storage unit 11 and a processing unit 12. The storage unit 11 may be a volatile semiconductor memory such as a random access memory (RAM) or a non-volatile storage such as a hard disk drive (HDD) or a flash memory. The processing unit 12 is, for example, a processor such as a central processing unit (CPU), a graphics processing unit (GPU), or a digital signal processor (DSP). The processing unit 12 may include an application-specific electronic circuit such as application-specific integrated circuit (ASIC) or a field programmable gate array (FPGA). The processor executes a program stored in a memory such as a RAM (which may be the storage unit 11). A group of processors may be referred to as a "multiprocessor" or simply a "processor".

The storage unit 11 stores a training data set including a plurality of training data records, on which the pre-processing has not been performed. The individual training data records may be referred to as a record or a sample, and the training data set 13 may be referred to as training data. In each of the plurality of training data records, a combination of data item values of a plurality of data items such as data items 13a and 13b are associated with label information 13c. Each of the plurality of data items may be referred to as an explanatory variable or a feature amount, and each record of the label information 13c may be referred to as an objective variable or a correct label. At least one of the plurality of data items is expressed by "continuous values" as its data item values. These "continuous values" are, for example, integers or real numbers and used to express a data item which has a large number of possible values. Each record of the label information 13c is binary classification information defined by YES or NO, for example.

The processing unit 12 performs pre-processing on the training data set 13, so as to generate a training data set 14 including a plurality of pre-processed training data records. The training data set 14 may be referred to as pre-processed training data. "Discretization" is performed in the process of conversion from the training data set 13 to the training data set 14. In this discretization, based on a predetermined criterion per data item, the processing unit 12 converts the original data item values, which are "continuous values", into discretized data values, which are "discrete values". After this discretization, the individual data item is expressed by "discrete values", which have a smaller number of possible values.

In accordance with the predetermined criterion, the processing unit 12 classifies the original data item values into a small number of classes and converts the original data item values into discretized data values that indicate the classes to which the original data item values belong. For example, the processing unit 12 divides the numerical range of the original data item values into a plurality of sections and converts the original data item values into discretized data values that indicate sections to which the original data item values belong. For example, the numerical range may be divided into a section 1 for values less than 20, a section 2 for values more than or equal to 20 and less than 50, and a section 3 for values more than or equal to 50. The data item value classification method, such as the numerical range division method, is the "criterion" of the discretization. As will be described below, the processing unit 12 is able to adjust the criterion for the discretization.

The processing unit 12 performs training processing for training a model 15 by using the pre-processed training data set 14. The model 15 receives the discretized data values of a plurality of data items as input and performs determination about the label information 13c. The machine learning algorithm used for training the model 15 is not limited to a particular algorithm. For example, the model 15 includes a plurality of determination rules for predicting a value of the label information 13c from a combination of discretized data values of some of the plurality of data items included in the training data set 14. For example, one determination rule may predict that the label information 13c represents "YES" when data item 13a represents "3" and the data item 13b represents "2". In addition, for example, the model 15 includes index values, which indicate the importance levels of the plurality of determination rules.

The processing unit 12 acquires a feature information set 16 including a plurality of feature data records and an index value set 17 including a plurality of index values from the execution result of the above training processing. Each of the plurality of feature data records indicate a combination of two or more data items used for the determination about the label information 13c among the plurality of data items included in the training data set 14. The plurality of feature data records included in the feature information set 16 indicate different combinations of data items. For example, a combination of data items indicated by one of the feature data records is a combination of data items used for a discretization data value condition defined by one determination rule included in the model 15. For example, when one determination rule defines a condition that the data item 13a represents "3" and the data item 13b represents "2", feature information indicating the combination of data item 13a and data item 13b is generated. The index values are associated with the feature data records and indicate the importance levels of their respective feature data records. For example, an index value associated with one determination rule in the model 15 is used as an index value.

The processing unit 12 selects at least one of the feature data records included in the feature information set 16, based on the index values included in the index value set 17. For example, the processing unit 12 preferentially selects a feature data record associated with an index value having a high importance level. The processing unit 12 may select at least one of the feature data records such that the same data item does not appear more than a predetermined number of times in the selected feature data records. For example, the processing unit 12 selects at least one of the feature data records from the feature information set 16 such that the same data item appears no more than once.

The processing unit 12 changes the criterion used for the discretization as the pre-processing, based on the at least one of the feature data records selected. For example, the processing unit 12 changes the data item value classification method, e.g., the method for dividing the numerical range of the data item values. By changing the criterion for the discretization, as a result of the pre-processing, the training data set 13 is converted into a training data set different from the training data set 14. For example, the processing unit 12 performs the training processing again by using the new pre-processed training data set and trains a new model. The processing unit 12 may output this retrained model as a result of the machine learning. The processing unit 12 may repeatedly change the criterion for the discretization and perform the training processing a plurality of times.

The processing unit 12 changes the criterion for the discretization in view of a combination of two or more data items indicated by a selected feature data record. For example, the processing unit 12 calculates a distribution of the label information 13c in a multi-dimensional space indicated by a combination of two or more data items. The processing unit 12 detects an area where training data records having the same value of the label information 13c relatively densely exist in the multi-dimensional space and adjusts the discretization criteria for the two or more data items such that the borders of the detected area become clear. By performing the discretization with a combination of two or more data items, the data item values are expected to be classified more suitably than a case where the discretization is performed per data item. When the discretization is performed for the first time, the discretization may be performed per data item.

The machine learning apparatus 10 according to the first embodiment performs the training processing by using training data discretized based on a predetermined criterion and determines important combinations of data items based on the execution result of the training processing. Next, the machine learning apparatus 10 changes the criterion for the discretization in view of the important combinations of data items. According to the first embodiment, the machine learning apparatus 10 discretizes the data items as pre-processing. Compared with a case where no discretization is performed, the machine learning apparatus 10 is able to train a model having a higher versatility while preventing overfitting and improve the accuracy of the model.

In addition, after changing the criterion for the discretization, since the machine learning apparatus 10 performs the discretization with a combination of two or more data items, the machine learning apparatus 10 is able to take a distribution of training data in a multi-dimensional space into consideration. Thus, compared with a case where the discretization is performed per data item, the machine learning apparatus 10 is able to classify the data item values more suitably and improve the accuracy of the model more. In addition, since the discretization is performed only on important combinations of data items, the machine learning apparatus 10 has less load on the pre-processing and the training processing, compared with a case where the discretization is performed comprehensively on various combinations of data items. In addition, since the data item values are prevented from being classified into excessively small sections, overfitting is prevented. Thus, the accuracy of the model is improved. In addition, since the combinations of data items are selected based on the execution result of the training processing, a risk of missing important combinations of data items that greatly affect the accuracy of the model is reduced.

Second Embodiment

Next, a second embodiment will be described.

A machine learning apparatus according to the second embodiment performs machine learning by using training data and trains a model that predicts a value of an objective variable from a combination of values of a plurality of explanatory variables. According to the second embodiment, Wide Learning (registered trademark) is used as the machine learning algorithm. The machine learning apparatus according to the second embodiment may be a client apparatus or a server apparatus. In addition, the machine learning apparatus according to the second embodiment may be referred to as a computer or an information processing apparatus.

Figure 2:
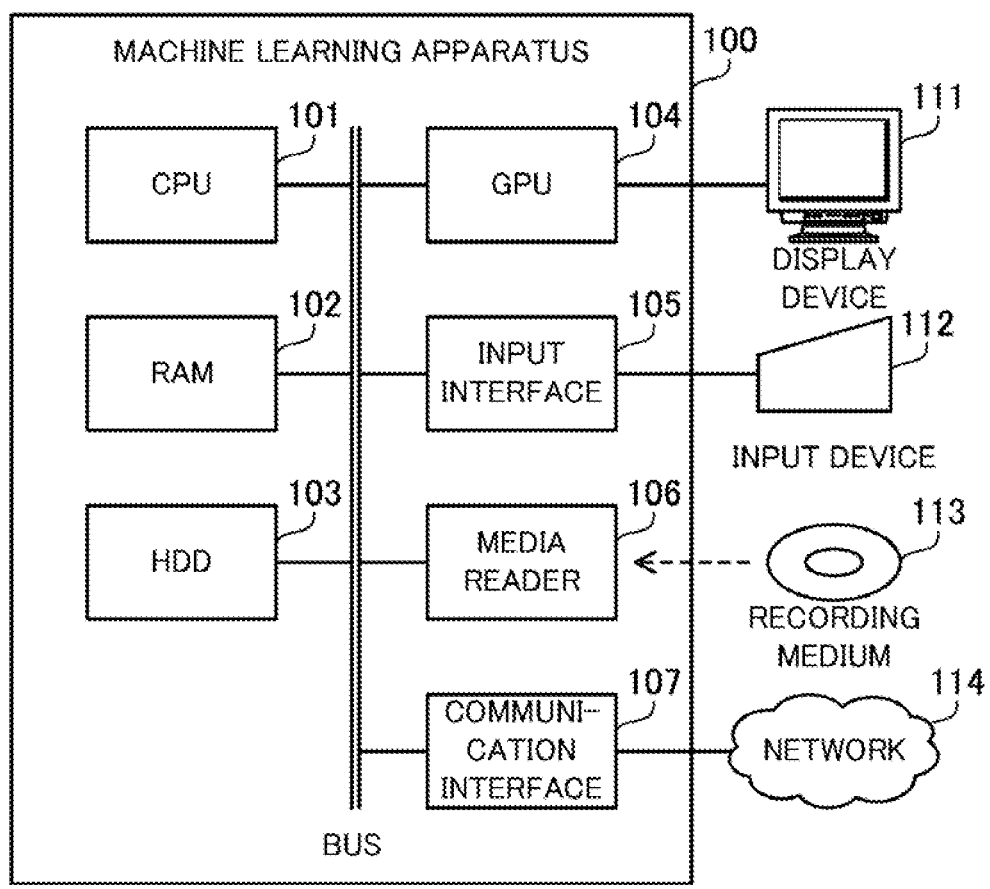
FIG. 2 illustrates a hardware example of a machine learning apparatus according to a second embodiment.

FIG. 2 illustrates a hardware example of the machine learning apparatus according to the second embodiment.

This machine learning apparatus 100 includes a CPU 101, a RAM 102, an HDD 103, a GPU 104, an input interface 105, a media reader 106, and a communication interface 107. These units of the machine learning apparatus 100 are connected to a bus. The machine learning apparatus 100 corresponds to the machine learning apparatus 10 according to the first embodiment. The CPU 101 corresponds to the processing unit 12 according to the first embodiment. The RAM 102 or the HDD 103 corresponds to the storage unit 11 according to the first embodiment.

The CPU 101 is a processor that executes program commands. The CPU 101 executes a program by loading at least part of the programs and data stored in the HDD 103 to the RAM 102. The CPU 101 may include a plurality of processor cores. The machine learning apparatus 100 may include a plurality of processors. A group of processors may be referred as "a multi-processor" or simply "a processor".

The RAM 102 is a volatile semiconductor memory that temporarily stores a program executed by the CPU 101 and data used for calculation by the CPU 101. The machine learning apparatus 100 may include a different kind of memory other than a RAM or may include a plurality of memories.

The HDD 103 is a non-volatile storage that stores an operating system (OS), middleware, software programs such as application software, and data. The machine learning apparatus 100 may include a different kind of storage, such as a flash memory or a solid state drive (SSD), or may include a plurality of storages.

The GPU 104 outputs an image to a display device 111 connected to the machine learning apparatus 100 in accordance with a command from the CPU 101. For example, any kind of display device may be used as the display device 111. Examples of the display device 111 include a cathode ray tube (CRT) display, a liquid crystal display (LCD), an organic electro luminescence (OEL) display, and a projector.

Other than the display device 111, an output device such as a printer may be connected to the machine learning apparatus 100.

The input interface 105 receives an input signal from an input device 112 connected to the machine learning apparatus 100. As this input device 112, any kind of input device such as a mouse, a touch panel, a touchpad, or a keyboard may be used. A plurality of kinds of input devices may be connected to the machine learning apparatus 100.

The media reader 106 is a reading device that reads a program and data recorded in a recording medium 113. As this recording medium 113, any kind of recording medium including a magnetic disk such as a flexible disk (FD) or an HDD, an optical disc such as a compact disc (CD) or a digital versatile disc (DVD), or a semiconductor memory may be used. For example, the media reader 106 copies the program and data read from the recording medium 113 to another recording medium such as the RAM 102 or the HDD 103. The read program is executed by, for example, the CPU 101. The recording medium 113 may be a portable recording medium and may be used for distribution of the program and data. The recording medium 113 and the HDD 103 may each be referred to as a computer-readable recording medium.

The communication interface 107 is connected to a network 114 and communicates with other information processing apparatuses via the network 114. The communication interface 107 may be a wired communication interface connected to a wired communication device, such as a switch or a router. Alternatively, the communication interface 107 may be a wireless communication interface connected to a wireless communication device, such as a base station or an access point.

Next, training data used in machine learning will be described.

FIG. 3 illustrates an example of a training data table.

A training data table 131 stores training data including a plurality of records corresponding to a plurality of samples. The training data stored in the training data table 131 is data collected at a manufacturing line at the time of manufacturing products. The individual sample included in the training data table 131 includes an identification (ID), values of a plurality of explanatory variables, and a value of an objective variable.

Each ID is an identifier that identifies a sample. Each explanatory variable is an index that could be related to occurrence of defective products. These explanatory variables may be referred to as feature amounts. Examples of the explanatory variables include temperature and chemical dosage. The values of the explanatory variables are measured by using sensor devices at the time of manufacturing products. When a product is manufactured, the temperature of the product is measured. The amount of certain chemical used for manufacturing the product is stored as the chemical dosage. The objective variable is a flag that indicates whether the manufactured product is a defective product. In FIG. 3, flag=1 indicates that the product is a defective product, and flag=0 indicates that the product is a good product. Whether a product is a defective product or not is determined by an inspection performed immediately after the product is manufactured.

The values of the objective variable may be collected by sampling some of the products flowing through the manufacturing line and manually inspecting these sampled products. Alternatively, the values of the objective variable may be collected by sampling some of the products flowing through the manufacturing line and inspecting these sampled products with a close inspection apparatus. According to the second embodiment, a model that indicates a relationship between the values of a plurality of explanatory variables and the quality of products is trained. By using this trained model, it is possible to easily detect the products that could be defective products from the sensor data measured from the products flowing through the manufacturing line.

Herein, pre-processing for improving the accuracy of the machine learning is performed on training data. The pre-processing includes "discretization". In the second embodiment, reducing the number of possible values of an explanatory variable is called discretization. Explanatory variables, such as temperature and chemical dosage, that are expressed by "continuous values" having a large number of possible values are converted into explanatory variables expressed by "discrete values" having a small number of possible values. The discretization is performed by dividing the range of possible values of an explanatory variable into two or more sections.

The discretization is especially effective in improving the model accuracy when performed on a certain machine learning algorithm. For example, by performing the discretization as the pre-processing on Wide Learning™, which will be described below, the model accuracy is significantly improved. There are cases where the discretization improves the model accuracy when performed on some other machine learning algorithms such as random forest.

FIG. 4 illustrates an example of a training data table obtained after the pre-processing.

A training data table 132 is generated by performing the discretization as the pre-processing on the training data table 131. The training data table 132 stores training data including a plurality of records corresponding to a plurality of samples, as is the case with the training data table 131. Note that some explanatory variables have been added to each of the samples in the training data table 132.

Each sample in the training data table 132 includes, as its explanatory variables, sections 1 to 3 corresponding to the temperature and includes, as its explanatory variables, sections 4 to 6 corresponding to the chemical dosage. Each of sections 1 to 3 as the explanatory variables indicates a flag indicating whether the corresponding temperature value belongs to this section. Each of sections 4 to 6 as the explanatory variables indicates a flag indicating whether the corresponding chemical dosage value belongs to this section. In FIG. 4, flag=1 indicates that the corresponding value belongs to this section, and flag=0 indicates that the corresponding value does not belong to this section. Herein, with the discretization, the possible values of the temperature are classified into three sections, and the possible values of the chemical dosage are classified into three sections. In each sample, one of the flags in the sections 1 to 3 indicates 1, and the other two flags indicate 0. In addition, in each sample, one of the flags in the sections 4 to 6 indicates 1, and the other two flags indicate 0.

Instead of adding new explanatory variables according to the individual sections obtained by the discretization, a numerical value may be assigned to each section and an explanatory variable expressed by a numerical value indicating a corresponding section may be added. For example, an explanatory variable may be added such that its value takes on "1" when a temperature value belongs to the section 1, its value takes on "2" when a temperature value belongs to the section 2, and its value takes on "3" when a temperature value belongs to the section 3. Likewise, another explanatory variable may be added such that its value takes on "1" when a chemical dosage value belongs to section 4, its value takes on "2" when a chemical dosage value belongs to section 5, and its value takes on "3" when a chemical dosage value belongs to section 6. In addition, the explanatory variables of the temperature and the chemical dosage whose values are not discretized may either be left or removed. The method of dividing the range of the possible values of an explanatory variable into two or more sections will be described below.

Next, Wide Learning™, which is a machine learning algorithm, will be described.

Figure 5:
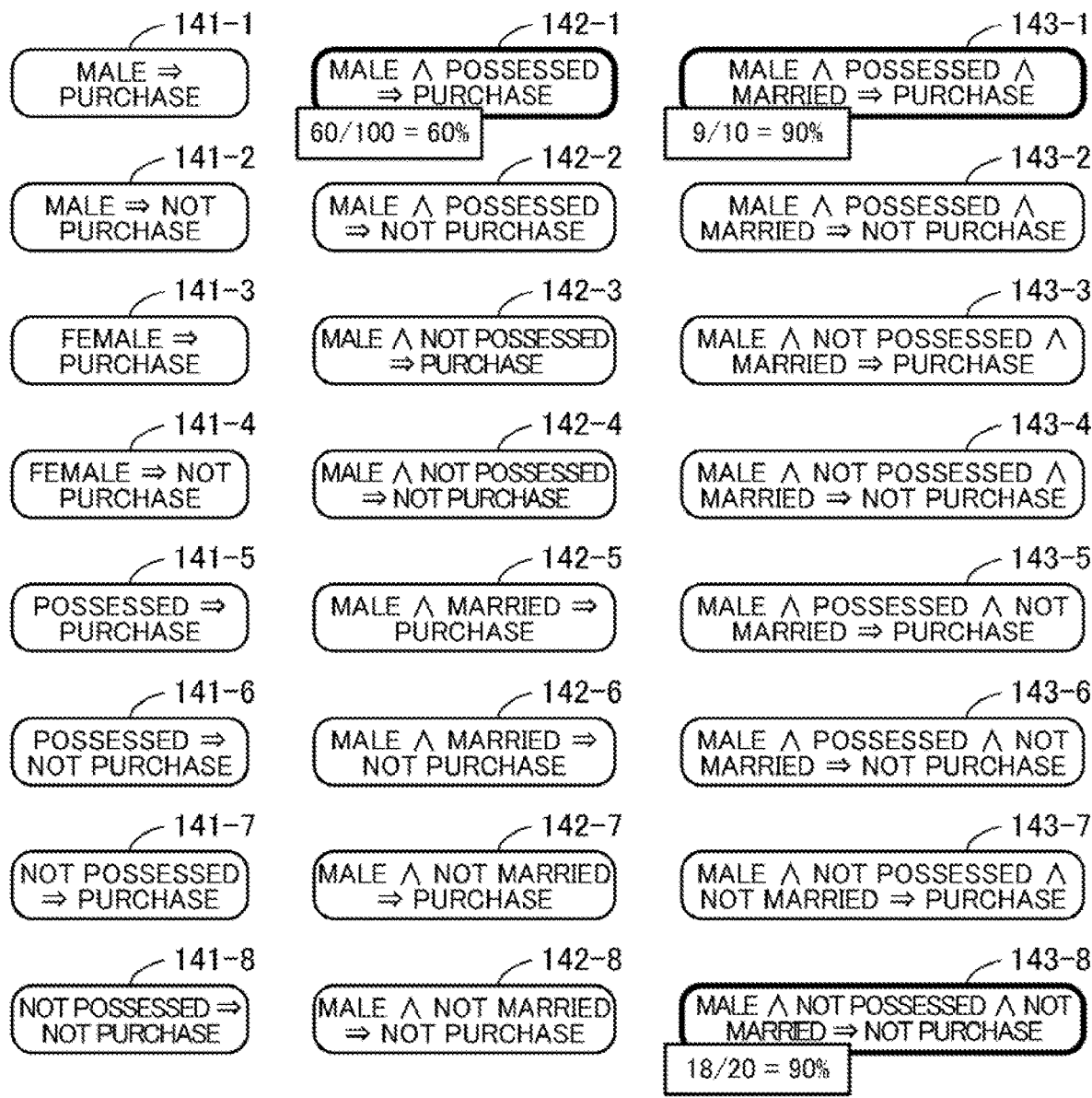
FIG. 5 illustrates an example of Wide Learning™.

FIG. 5 illustrates an example of Wide Learning™.

In Wide Learning™, chunks indicating hypotheses, each of which could be established between a combination of values of a small number of explanatory variables and a value of an objective variable, are comprehensively generated. Next, from these many chunks, chunks indicating a reliable hypothesis, are adopted based on training data. The adopted set of chunks is used as a model. The hypothesis indicated by a chunk is a logical proposition that the value of an objective variable is a certain value if the values of certain explanatory variables are certain values. The hypothesis part of a hypothesis could be a logical product of conditions about two or more explanatory variables.

Of all the samples included in the training data, the number of samples whose explanatory variable values match the hypothesis part of a hypothesis and whose objective variable values match the conclusion part of the hypothesis is the hit count of the hypothesis. A chunk indicating a hypothesis with a higher hit count is considered as being more reliable. In addition, the ratio of samples whose objective variable values match the conclusion part of the hypothesis to all the samples whose explanatory variable values match the hypothesis part of the hypothesis is the hit ratio of the hypothesis. A chunk indicating a hypothesis with a higher hit ratio is considered as being more reliable. To improve the versatility of the chunks and prevent overfitting, it is preferable that the number of explanatory variables included in a single chunk be limited to a threshold or less. In addition, it is preferable that chunks whose hit count is more than or equal to a threshold and whose hit ratio is more than or equal to a threshold be adopted as effective hypotheses.

A case in which Wide Learning™ is performed by using training data stored in a training data table 133 will be described as an example. Each sample included in the training data in the training data table 133 includes values of explanatory variables such as a gender, a license status, and a marriage status and a value of an objective variable of a purchase status. The gender is indicated by binary data representing "male" or "female". The license status is indicated by binary data representing "possessed" or "not possessed". The marriage status is indicated by binary data representing "married" or "not married". The purchase status is indicated by binary data representing "purchased" or "not purchased".

In Wide Learning™, the possible values of a plurality of explanatory variables and the possible values of an objective variable are listed. Herein, the above values about the gender, the license status, the marriage status, and the purchase status are listed. Next, the number of explanatory variables, the number being less than or equal to a threshold, are selected from the plurality of explanatory variables. For example, the number of explanatory variables, the number being between one and three, inclusive, are selected. Next, a single value is selected from each of the selected explanatory variables, and a single value is selected from the objective variable, to generate a single chunk indicating a single hypothesis. By comprehensively performing the selection of the explanatory variables and selectin of the values, chunks indicating various hypotheses are comprehensively generated.

In this case, a plurality of chunks including chunks 141-1 to 141-8, 142-1 to 142-8, and 143-1 to 143-8 are generated from the training data table 133. The chunks 141-1 to 141-8 each include a single explanatory variable. The chunks 142-1 to 142-8 each include two explanatory variables. The chunks 143-1 to 143-8 each include three explanatory variables.

The chunk 141-1 indicates a hypothesis that the gender "male" results in "purchase". The chunk 141-2 indicates a hypothesis that the gender "male" results in "not purchase". The chunk 141-3 indicates a hypothesis that the gender "female" results in "purchase". The chunk 141-4 indicates a hypothesis that the gender "female" results in "not purchase". The chunk 141-5 indicates a hypothesis that the license status "possessed" results in "purchase". The chunk 141-6 indicates a hypothesis that the license status "possessed" results in "not purchase". The chunk 141-7 indicates a hypothesis that the license status "not possessed" results in "purchase". The chunk 141-8 indicates a hypothesis that the license status "not possessed" results in "not purchase".

The chunk 142-1 indicates a hypothesis that a combination of the gender "male" and the license status "possessed" results in "purchase". The chunk 142-2 indicates a hypothesis that a combination of the gender "male" and the license status "possessed" results in "not purchase". The chunk 142-3 indicates a hypothesis that a combination of the gender "male" and the license status "not possessed" results in "purchase". The chunk 142-4 indicates a hypothesis that a combination of the gender "male" and the license status "not possessed" results in "not purchase". The chunk 142-5 indicates a hypothesis that a combination of the gender "male" and the marriage status "married" results in "purchase". The chunk 142-6 indicates a hypothesis that a combination of the gender "male" and the marriage status "married" results in "not purchase". The chunk 142-7 indicates a hypothesis that a combination of the gender "male" and the marriage status "not married" results in "purchase". The chunk 142-8 indicates a hypothesis that a combination of the gender "male" and the marriage status "not married" results in "not purchase".

The chunk 143-1 indicates a hypothesis that a combination of the gender "male", the license status "possessed", and the marriage status "married" results in "purchase". The chunk 143-2 indicates a hypothesis that a combination of the gender "male", the license status "possessed", and the marriage status "married" results in "not purchase". The chunk 143-3 indicates a hypothesis that a combination of the gender "male", the license status "not possessed", and the marriage status "married" results in "purchase". The chunk 143-4 indicates a hypothesis that a combination of the gender "male", the license status "not possessed", and the marriage status "married" results in "not purchase". The chunk 143-5 indicates a hypothesis that a combination of the gender "male", the license status "possessed", and the marriage status "not married" results in "purchase". The chunk 143-6 indicates a hypothesis that a combination of the gender "male", the license status "possessed", and the marriage status "not married" results in "not purchase". The chunk 143-7 indicates a hypothesis that a combination of the gender "male", the license status "not possessed", and the marriage status "not married" results in "purchase". The chunk 143-8 indicates a hypothesis that a combination of the gender "male", the license status "not possessed", and the marriage status "not married" results in "not purchase".

A hit count and a hit ratio are calculated for each of these chunks 141-1 to 141-8, 142-1 to 142-8, and 143-1 to 143-8. For example, regarding the chunk 142-1, assuming that 100 samples indicate the gender "male" and the license state "possessed" and that 60 of these 100 samples indicate "purchase", the hit count of the chunk 142-1 is 60 and the hit ratio is 60%. Likewise, regarding the chunk 143-1, assuming that 10 samples indicate the gender "male", the license status "possessed", and the marriage status "married" and that 9 of these 10 samples indicate "purchase", the hit count of the chunk 143-1 is 9 and the hit ratio is 90%. In addition, regarding the chunk 143-8, assuming that 20 samples indicate the gender "male", the license status "not possessed", and the marriage status "not married" and that 18 of these 20 samples indicate "not purchase", the hit count of the chunk 143-8 is 18 and the hit ratio is 90%.

The chunks whose hit count is more than or equal to a threshold and whose hit ratio is more than or equal to a threshold are adopted as effective chunks. Alternatively, all the chunks whose hit count is more than or equal to a threshold may be adopted as the effective chunks or all the chunks whose hit ratio is more than or equal to a threshold may be adopted as the effective chunks. Alternatively, no threshold may be set for the hit count or the hit ratio. In this case, the predetermined number of chunks may be selected in descending order of the hit count or the hit ratio as the effective chunks. An importance level is calculated for each effective chunk. For example, the importance level may be a hit count, a hit ratio, or an index proportional to the hit count or the hit ratio. According to the second embodiment, weights calculated by logistic regression analysis are used.

A probability p(x) is calculated for a sample x by using a sigmoid function as expressed by mathematical expression (1). The probability p(x) is a real number, which is more than 0 and less than 1. The probability p(x) corresponds to an estimated value of an objective variable of the sample x. If the probability p(x) is closer to 1, it is more likely that the value of the objective variable represents 1 (for example, a defective product). If the probability p(x) is closer to 0, it is more likely that the value of the objective variable represents 0 (for example, a good product). "z(x)" in mathematical expression (1) is defined as expressed by mathematical expression (2). "z(x)" corresponds to a linear sum of estimation results of one or more chunks relating to the sample x. The range of possible values of z(x) falls between $-\infty$ and $+\infty$. The sigmoid function expressed by mathematical expression (1) converts "z(x)" into the probability p(x) in the range of 0 to 1.

$$p(x) = \frac{1}{1 + e^{-z(x)}} \quad (1)$$

$$z(x) = \alpha + \sum_i \beta_i \times chunk_i(x) \quad (2)$$

In mathematical expression (2), $\alpha$ is a coefficient as a constant term, $\beta_i$ is a coefficient as the weight of the i-th chunk, and $chunk_i(x)$ is the output of the i-th chunk with respect to the sample x. When the value of an explanatory variable of the i-th chunk does not match the value of an explanatory variable of the sample x, $chunk_i(x)$ outputs "0". In this case, the i-th chunk is unrelated to the sample x, and the value of z(x) is not affected. When the value of the explanatory variable of the i-th chunk matches the value of the explanatory variable of the sample x, $chunk_i(x)$ outputs "1" or "−1". When the estimated value of the objective variable of the i-th chunk is "1" (for example, a defective product), $chunk_i(x)$ outputs "1". When the estimated value of the objective variable of the i-th chunk is "0" (for example, a good product), $chunk_i(x)$ outputs "−1".

A larger value of z(x) indicates that more chunks related to the sample x have estimated "1" as the value of the objective variable. A smaller value of z(x) indicates that more chunks related to the sample x have estimated "0" as the value of the objective variable. Note that the value of z(x) changes when the coefficients $\alpha$ and $\beta_i$ are changed. The difference between the probability p(x) obtained by the conversion from z(x) and the true value of the objective variable of the sample x is an error. Thus, by performing a regression analysis, the coefficients $\alpha$ and $\beta_i$ are determined such that the total of the errors about many samples is minimized. The coefficient $\beta_i$ determined in this way is used as the importance level of the i-th chunk.

Next, discretization performed as pre-processing on training data will be described.

In the discretization, the range of values of an explanatory variable is divided into two or more sections, and the values belonging to the same section will be seen as the same value. In this way, the values of the explanatory variable are approximated, and the number of possible values of the explanatory variable is reduced.

In one simple discretization method, the range of values of an explanatory variable is divided into equal intervals. For example, the values of an explanatory variable included in training data are sorted in ascending order, and the range from the minimum value to the maximum value is calculated. Next, the range is divided by a predetermined section number, to determine the width of each section. In this way, the range from the minimum value to the maximum value is divided into sections, each of which has the same width. In another simple discretization method, the range of values of an explanatory variable is divided at the same frequency. For example, the samples included in training data are sorted in ascending order of the values of an explanatory variable, and the total number of samples is counted. Next, the total number of samples is divided by a predetermined section number, and the number of samples per section is calculated. In this way, the sorted samples are divided by this sample number.

However, whether based on the equal intervals or the same frequency, the discretization takes only a distribution of values of an explanatory variable into consideration. That is, the discretization does not take the values of the objective variable of the samples into consideration. By taking the values of the objective variable into consideration, the borders of the values of the explanatory variables that affect the values of the objective variable are easily found by machine learning. That is, by taking the values of the objective variable into consideration, the accuracy of the training result of the machine learning is improved. Therefore, entropy-based discretization may be adopted.

Figure 6:
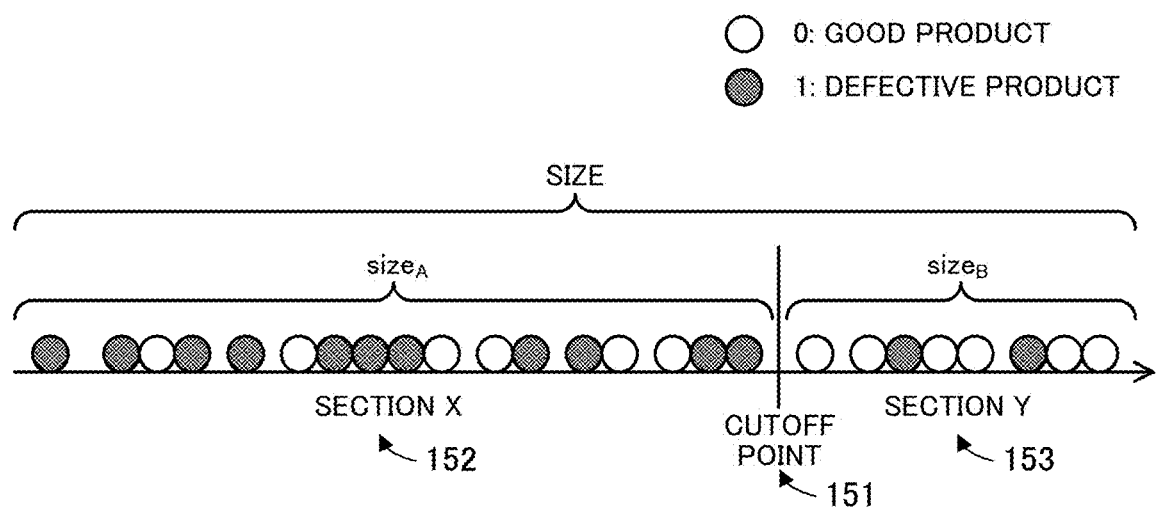
FIG. 6 illustrates an example of entropy-based discretization.

FIG. 6 illustrates an example of entropy-based discretization.

In the entropy-based discretization, the samples included in training data are sorted in ascending order of the values of an explanatory variable, and a section where samples having the same objective variable value densely exist is detected. It is preferable that the same objective variable value be dominant in a single section as much as possible. It is preferable that a group of samples having "1" as the value of the objective variable not be divided as much as possible. It is preferable that a group of samples having "0" as the value of the objective variable not be divided as much as possible. If there is a group that includes samples having "1" and samples having "0" as the value of the objective variable, it is preferable that this group of samples be divided according to the values of the objective variable as much as possible. In the entropy-based discretization, a border of a plurality of sections is determined based on a distribution of samples having the same objective variable value. A border of two neighboring sections may be referred to as a cutoff point.

For example, focusing on the explanatory variable indicating the chemical dosage, the plurality of samples included in the training data are sorted in ascending order of the chemical dosage. As a result, the plurality of samples are listed on a one-dimensional straight line indicating the chemical dosage. On this straight line, a cutoff point 151 is determined such that a bias in the objective variable values is maximized. As a result, the pre-division numerical range is divided into a section 152 (a section X) where the chemical dosage value is less than the cutoff point 151 and a section 153 (a section Y) where the chemical dosage value is more than or equal to the cutoff point 151. In the section 152, many samples indicate "1" (a defective product) as their objective variable value. In the section 153, many samples indicate "0" (a good product) as their objective variable value. The cutoff point 151 has been determined such that more samples in the section 152 indicate "1" as their objective variable value and more samples in the section 153 indicate "0" as their objective variable value.

The total number of samples belonging to the pre-division range is SIZE. The number of samples belonging to the post-division section 152 is sizeA, and the number of samples belonging to the post-division section 153 is size3 (SIZE=sizeA+size3). In addition, a cutoff point may recursively be set in each of the post-division sections 152 and 153. The recursive division may be repeated, as long as a section having biased objective variable values is effectively generated.

A calculation method for the entropy-based discretization will be described by using mathematical expressions. A single cutoff point "cut" is temporarily selected in a pre-division numerical range. Accordingly, a pre-division sample set "all" is divided into a sample set A having the explanatory variable values less than the cutoff point "cut" and a sample set B having the explanatory variable values more than or equal to the cutoff point "cut".

An entropy H(A) of the sample set A is calculated, as expressed by mathematical expression (3). P(A) in mathematical expression (3) is the ratio of samples indicating "1" as their objective variable value to the samples belonging to the sample set A. In addition, an entropy H(B) of the sample set B is calculated, as expressed by mathematical expression (4). P(B) in the mathematical expression (4) is the ratio of samples indicating "1" as their objective variable value to the samples belonging to the sample set B. As expressed by mathematical expression (5), an entropy H(cut) at the cutoff point "cut" is a weighted average of the entropies H(A) and H(B) based on the ratio of the number of samples in the sample set A to the number of samples in the sample set B. A cutoff point "cut" is searched for such that this entropy H(cut) is minimized.

$$H(A) = -P(A)\log_2 P(A) \tag{3}$$

$$H(B) = -P(B)\log_2 P(B) \tag{4}$$

$$H(\text{cut}) = \frac{size_A}{\text{SIZE}} H(A) + \frac{size_B}{\text{SIZE}} H(B) \tag{5}$$

After a cutoff point "cut" achieving the minimum entropy is searched, next, whether to divide the section with this cutoff point "cut" is determined. First, the entropy H(all) of the pre-division sample set "all" is calculated, as expressed by mathematical expression (6). P(all) in mathematical expression (6) is the ratio of samples indicating "1" as their objective variable value to the samples belonging to the sample set "all". Next, as expressed by mathematical expression (7), the difference between the entropy H(all) and the entropy H(cut) is calculated as a gain. In addition, Δ is calculated, as expressed by mathematical expression (8) in which $k_0$ is the number of different objective variables (the number of classes of correct labels) present in the sample set "all", $k_A$ is the number of classes of correct labels in the sample set A, and $k_a$ is the number of classes of correct labels in the sample set B. In many cases, when an objective variable value is a binary value representing "1" or "0", $k_0=k_A=k_3=2$.

$$H(\text{all}) = -P(\text{all})\log_2 P(\text{all}) \tag{6}$$

$$\text{gain} = H(\text{all}) - H(\text{cut}) \tag{7}$$

$$\Delta = \log_2(3^{k_0} - 2) - (k_0 H(\text{all}) - k_A H(A) - k_B H(B)) \tag{8}$$

Next, as expressed by mathematical expression (9), a threshold is calculated by using the sample number SIZE of the sample set "all" and Δ defined by mathematical expression (8), and the gain defined by mathematical expression (7) is compared with the threshold. If the gain is larger than the threshold, the cutoff point "cut" is adopted, and the section is divided by the cutoff point "cut". If the gain is less than or equal to the threshold, the cutoff point "cut" is not adopted, and the section is not divided by the cutoff point "cut". If a new cutoff point is adopted, a sample set belonging to a post-division section is considered as the sample set "all", and the above division determination is performed recursively. The division determination is performed on all the post-division sections. If there is no section that needs to be divided, the discretization is ended.

$$\text{gain} > \frac{\log_2(\text{SIZE} - 1)}{\text{SIZE}} + \frac{\Delta}{\text{SIZE}} \tag{9}$$

Hereinafter, a problem with the discretization performed per explanatory variable will be described.

Figure 7:
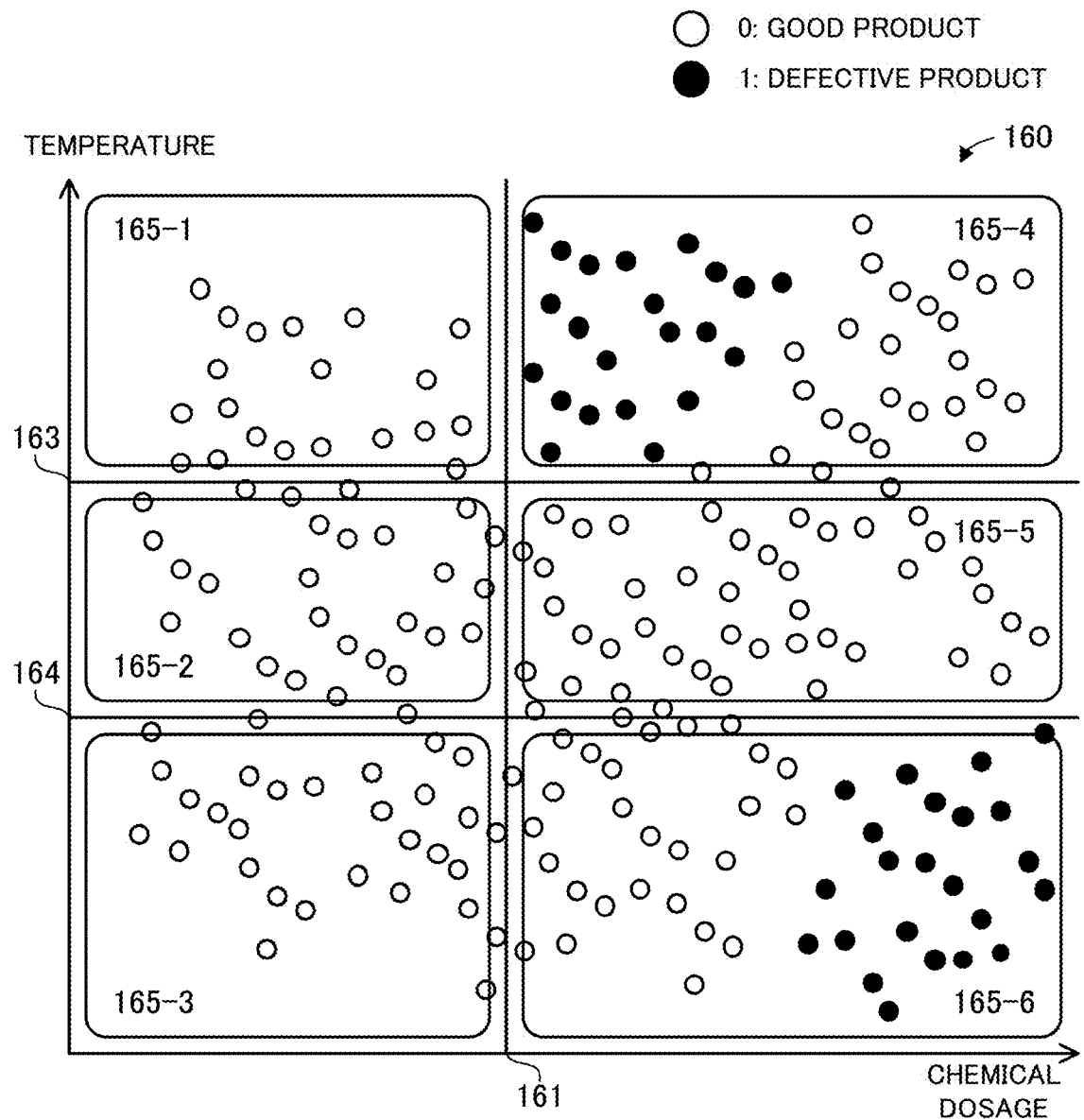
FIG. 7 illustrates an example of a relationship between a distribution of samples and discretization.

FIG. 7 illustrates an example of a relationship between a distribution of samples and discretization.

The following description will focus on the chemical dosage and the temperature as the explanatory variables. A graph 160 indicates a distribution of samples in a two-dimensional space formed by a horizontal axis indicating the chemical dosage and a vertical axis indicating the temperature. A distribution of the chemical dosage values of the samples included in the graph 160 is projected on the horizontal axis, and a distribution of the temperature values of the samples included in the graph 160 is projected on the vertical axis.

By performing the entropy-based discretization of the chemical dosage values, a cutoff point 161 is detected. In a section where the chemical dosage value is less than the cutoff point 161, most samples indicate "0" as their objective variable value. In a section where the chemical dosage value is more than or equal to the cutoff point 161, samples indicating "0" as their objective variable value and samples indicating "1" as their objective variable value coexist in a certain ratio. As seen from the distribution projected on the horizontal axis, since the values of the objective variable are not biased in the section where the chemical dosage value is more than or equal to the cutoff point 161, this section is no longer divided.

Next, by performing the entropy-based discretization of the temperature values, cutoff points 163 and 164 are detected. In a section where the temperature value is less than the cutoff point 164, samples indicating "0" as their objective variable value and samples indicating "1" as their objective variable value coexist in a certain ratio. In a section where the temperature value is more than or equal to the cutoff point 164 and less than the cutoff point 163, most samples indicate "0" as their objective variable value. In a section where the temperature value is more than or equal to the cutoff point 163, samples indicating "0" as their objective variable value and samples indicating "1" as their objective variable value coexist in a certain ratio.

If the cutoff points 161, 163, and 164 are set as described above, the two-dimensional space formed by the chemical dosage and the temperature is divided into areas 165-1 to 165-6. The samples whose chemical dosage value is less than the cutoff point 161 and whose temperature value is more than or equal to the cutoff point 163 belong to the area 165-1. The samples whose chemical dosage value is less than the cutoff point 161 and whose temperature value is less than the cutoff point 163 and more than or equal to the cutoff point 164 belong to the area 165-2. The samples whose chemical dosage value is less than the cutoff point 161 and whose temperature value is less than the cutoff point 164 belong to the area 165-3. The samples whose chemical dosage value is more than or equal to the cutoff point 161 and whose temperature value is more than or equal to the cutoff point 163 belong to the area 165-4. The samples whose chemical dosage value is more than or equal to the cutoff point 161 and whose temperature value is less than the cutoff point 163 and more than or equal to the cutoff point 164 belong to the area 165-5. The samples whose chemical dosage is more than or equal to the cutoff point 161 and whose temperature value is less than the cutoff point 164 belong to the area 165-6.

However, the areas 165-4 and 165-6 need to be divided further. The area 165-4 has a biased distribution. That is, in a partial area corresponding to the smaller chemical dosage value, most samples indicate "1" as their objective variable value, and in a partial area corresponding to the larger chemical dosage value, most samples indicate "0" as their objective variable value. The area 165-6 also has a biased distribution. That is, in a partial area corresponding to the smaller chemical dosage value, most samples indicate "0" as their objective variable value, and in a partial area corresponding to the large chemical dosage value, most samples indicate "1" as their objective variable value. By adding one cutoff point about the chemical dosage values, the accuracy about the border between the samples indicating "1" as their objective variable value and the samples indicating "0" as their objective variable value is improved.

Thus, if the discretization is performed per explanatory variable and a distribution of objective variable values is evaluated one dimensionally, a preferable cutoff point could be missed. In contrast, by performing the discretization in consideration of a combination of two or more explanatory variables and by evaluating a distribution of objective variable values in a multi-dimensional space, it becomes easier to detect a border between sample sets having different objective variable values. As a result, the accuracy of the model generated by machine learning could be improved.

However, there is a problem of how to narrow down a combination of explanatory variables taken into consideration in the discretization. If various combinations of explanatory variables are comprehensively taken into consideration, many cutoff points are set for a certain explanatory variable, and the range of possible values of the explanatory variable could be divided into an excessively large number of sections. If a section is divided into an excessively large number of sections, the effect obtained by the discretization is reduced, and a model that is excessively dependent on the training data could be generated as a result of overfitting. In addition, if a section is divided into an excessively large number of sections, the load on the pre-processing on the training data and the subsequent machine learning thereafter is increased. In addition, since the important explanatory variables that affect the objective variable values are only part of the explanatory variables included in the training data, not all of the many cutoff points contribute to improvement of the model accuracy.

Thus, according to the second embodiment, Wide Learning™ is temporarily performed to estimate important sets of explanatory variables, based on the training result of Wide Learning™. Next, the discretization is performed on only the important sets of explanatory variables, and Wide Learning™ is performed again. In this way, it is possible to efficiently detect important cutoff points and efficiently improve the model accuracy.

FIG. 8 illustrates an example of selection of explanatory variable sets used for discretization.

The machine learning apparatus 100 performs discretization of training data per explanatory variable as pre-processing and performs Wide Learning™ for the first time by using the pre-processed training data. However, the machine learning apparatus 100 may perform the first Wide Learning™ on training data without performing the discretization of the training data. The machine learning apparatus 100 generates a chunk table 134 from the training result of the first Wide Learning™. The chunk table 134 stores information about a plurality of chunks indicating effective hypotheses. The information about an individual chunk includes a combination of explanatory variable values corresponding to the hypothesis part of a hypothesis and the importance level of this chunk calculated by the above method. The plurality of chunks registered in the chunk table 134 are sorted in descending order of the importance level.

For example, the first chunk is for estimating the value of an objective variable of an individual sample indicating 3 or more as the value of a variable A and 4 or more as the value of a variable B, and the importance level of the first chunk is 2.33. The second chunk is for estimating the value of an objective variable of an individual sample indicating 3 or more as the value of a variable C and 4 or more as the value of a variable D, and the importance level of the second chunk is 1.18. The third chunk is for estimating the value of an objective variable of an individual sample indicating 0.2 or less as the value of the variable A and 3 or more as the value of the variable B, and the importance level of the third chunk is 0.92. The fourth chunk is for estimating the value of an objective variable of an individual sample indicating 0.2 or less as the value of the variable A and or more as the value of the variable B, and the importance level of the fourth chunk is 0.86. The fifth chunk is for estimating the value of an objective variable of an individual sample indicating 2 or less as the value of the variable A and 2 or less as the value of the variable D, and the importance level of the fifth chunk is 0.77. The sixth chunk is for estimating the value of an objective variable of an individual sample indicating 0.2 as the value of the variable A and 0.1 or less as the value of the variable D, and the importance level of the sixth chunk is 0.63.

In the example in FIG. 8, while each of the chunks registered in the chunk table 134 has two explanatory variables, some of the chunks may have a different number of explanatory variables. In Wide Learning™, if the number of explanatory variables in each chunk is limited to 3, the chunk table 134 could include a chunk having one explanatory variable, a chunk having two explanatory variables, and a chunk having three explanatory variables. The chunks used in the following processing have two or more explanatory variables, and different numbers of explanatory variables may coexist among the chunks.

The machine learning apparatus 100 estimates the sets of explanatory variables that appear in the chunk table 134 as the important sets of explanatory variables. However, to prevent setting of many cutoff points for the same explanatory variable, a single explanatory variable is subject to the discretization only once. The sets of explanatory variables on which the discretization is performed are selected based on the importance level or the appearance number.

When the sets of explanatory variables are selected based on the importance level, the machine learning apparatus 100 generates an importance level table 135 from the chunk table 134. In the importance level table 135, sets of explanatory variables are associated with importance levels. The sets of explanatory variables in the importance level table 135 are those that appear in the chunk table 134. Each of the sets of explanatory variables in the importance level table 135 includes two or more explanatory variables and may include a different number of explanatory variables. An individual record in the importance level table 135 includes the highest one of the importance levels associated with one or more chunks including a certain set of explanatory variables. The explanatory variable sets in the importance level table 135 are sorted in descending order of the importance level.

For example, the first, third, and fourth chunks in the chunk table 134 include a set of variables A and B. Accordingly, the importance level 2.33, which is the highest importance level, is associated with the set of variables A and B. In addition, the second chunk in the chunk table 134 includes a set of variables C and D. Accordingly, the importance level 1.18 is associated with the set of variables C and D. In addition, the fifth and sixth chunks in the chunk table 134 include a set of variables A and D. Accordingly, the importance level 0.77, which is the highest importance level, is associated with the set of variables A and D.

When the sets of explanatory variables are selected based on the appearance number, the machine learning apparatus 100 generates an appearance number table 136 from the chunk table 134. In the appearance number table 136, sets of explanatory variables are associated with appearance numbers. The sets of explanatory variables in the appearance number table 136 are those that appear in the chunk table 134. Each of the explanatory variable sets in the appearance number table 136 includes two or more explanatory variables and may have a different number of explanatory variables. An individual record in the appearance number table 136 includes the number of chunks including a certain set of explanatory variables among the chunks in the chunk table 134. The explanatory variable sets in the appearance number table 136 are sorted in descending order of the appearance number.

For example, the first, third, and fourth chunks in the chunk table 134 include a set of variables A and B. Accordingly, the appearance number 3 is associated with the set of variables A and B. In addition, the fifth and sixth chunks in the chunk table 134 include a set of variables A and D. Accordingly, the appearance number 2 is associated with the set of variables A and D. In addition, the second chunk in the chunk table 134 includes a set of variables C and D. Accordingly, the appearance number 1 is associated with the set of variables C and D.

The machine learning apparatus 100 generates a target variable table 137, which includes the explanatory variable sets on which the discretization is to be performed, based on the importance level table 135 or the appearance number table 136. In the target variable table 137, the same explanatory variable appears only once.

When the explanatory variable sets are selected based on the importance levels, the machine learning apparatus 100 extracts the explanatory variable sets from the importance level table 135 in descending order of the importance level. When all the explanatory variables included in the extracted explanatory variable sets are unused, the machine learning apparatus 100 adopts the extracted explanatory variable sets and registers these sets in the target variable table 137. When at least one explanatory variable included in the extracted explanatory variable sets has already been used, the machine learning apparatus 100 discards this extracted explanatory variable set.

For example, the set of variables A and B is extracted from the importance level table 135. Since both of the variables A and B are unused, the set of variables A and B is registered in the target variable table 137. Next, the set of variables C and D is extracted from the importance level table 135. Since both of the variables C and D are unused, the set of variables C and D is registered in the target variable table 137. Next, the set of variables A and D is extracted from the importance level table 135. Since the variable A has already been used, the set of variables A and D is discarded. That is, the set of variables A and D is not registered in the target variable table 137. When the explanatory variable sets are selected based on the importance levels, the discretization is achieved without missing combinations of explanatory variables having high importance levels.

When the explanatory variable sets are selected based on the appearance numbers, the machine learning apparatus 100 extracts the explanatory variable sets from the appearance number table 136 in descending order of the appearance number. If all the explanatory variables included in the extracted explanatory variable sets are unused, the machine learning apparatus 100 adopts the extracted explanatory variable sets and registers these sets in the target variable table 137. If at least one explanatory variable included in the extracted explanatory variable sets has already been used, the machine learning apparatus 100 discards this extracted explanatory variable set.

For example, the set of variables A and B is extracted from the appearance number table 136. Since both of the variables A and B are unused, the set of variables A and B is registered in the target variable table 137. Next, the set of variables A and D is extracted from the appearance number table 136. Since the variable A has already been used, the set of variables A and D is discarded. That is, the set of variables A and D is not registered in the target variable table 137. Next, the set of variables C and D is extracted from the appearance number table 136. Since both of the variables C and D are unused, the set of variables C and D is registered in the target variable table 137. When the explanatory variable sets are selected based on the appearance numbers, the combinations of explanatory variables strongly related to the values of the objective variable are discretized.

Next, entropy-based discretization of a plurality of sets of explanatory variables will be described.

Figure 9:
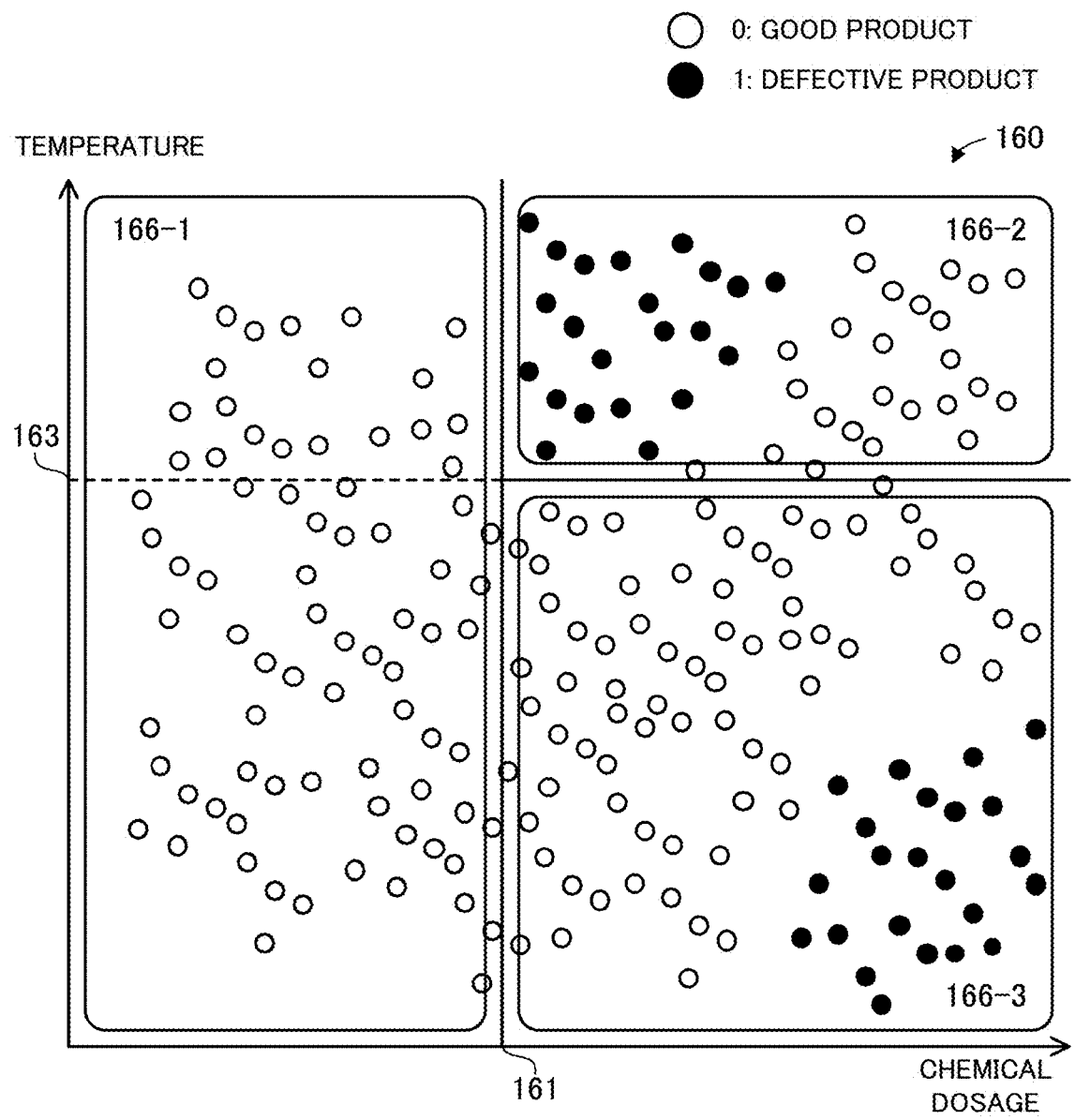
FIG. 9 illustrates the first half of an example of discretization of a plurality of explanatory variables.

FIG. 9 illustrates the first half of an example of discretization of a plurality of explanatory variables.

A plurality of explanatory variables are discretized in accordance with mathematical expressions (3) to (9), as is the case with the discretization of a single explanatory variable. The discretization of a plurality of explanatory variables includes selecting a single explanatory variable, to which a cutoff point is added next, from a plurality of explanatory variables combined.

Specifically, for each of the plurality of explanatory variables, a cutoff point achieving the minimum entropy is searched for in accordance with mathematical expressions (3) to (5). A cutoff point achieving the minimum entropy is selected from a plurality of cutoff points corresponding to a plurality of explanatory variables. In this way, an explanatory variable to be considered next and a candidate of a cutoff point to be added are determined. After a single cutoff point of a single explanatory variable is determined, whether or not this cutoff point is adopted is determined in accordance with mathematical expressions (6) to (9). If the gain of the cutoff point is over the corresponding threshold, the cutoff point is adopted. If the gain is less than or equal to the corresponding threshold, the cutoff point is not adopted. If the single cutoff point is added to the single explanatory variable, the corresponding area in the multi-dimensional space formed by the plurality of explanatory variables is divided. The above area division is performed hierarchically until no further addition of a cutoff point and area division is needed.

For example, the following description considers discretizing two explanatory variables of the chemical dosage and the temperature in combination. The two-dimensional space in the graph 160 in FIG. 7 is divided into a plurality of areas as follows. First, the chemical dosage values of the plurality of samples included in the training data are sorted in ascending order. In addition, the temperature values of the plurality of samples included in the training data are sorted in ascending order.

Next, about the chemical dosage, a cutoff point achieving the minimum entropy is searched for based on a bias in the values of the objective variable. Independently of this, about the temperature, a cutoff point achieving the minimum entropy is searched for based on a bias in the values of the objective variable. This example assumes that the entropy of the cutoff point 161 about the chemical dosage is smaller than that of the cutoff point about the temperature and that the gain of the cutoff point 161 is larger than the corresponding threshold. Accordingly, the cutoff point 161 is added for the chemical dosage. As a result, the two-dimensional space of the graph 160 is divided into an area 166-1 where the chemical dosage value is less than the cutoff point 161 and an area where the chemical dosage value is more than or equal to the cutoff point 161.

Next, by using the samples belonging to the area 166-1, a cutoff point achieving the minimum entropy about the chemical dosage is searched for and a cutoff point achieving the minimum entropy about the temperature is searched for. The sample set belonging to the area 166-1 corresponds to the above sample set "all". Since most samples in the area 166-1 indicate "0" as their objective variable value, no cutoff point is adopted. Thus, no further division determination is performed on the area 166-1.

Next, by using the samples in the area outside the area 166-1, a cutoff point achieving the minimum entropy about the chemical dosage is searched for and a cutoff point achieving the minimum entropy about the temperature is searched for. The samples belonging to the area outside the area 166-1, that is, the sample set where the chemical dosage value is more than or equal to the cutoff point 161, correspond to the above sample set "all". This example assumes that the entropy of the cutoff point 163 about the temperature is less than that of the cutoff point about the chemical dosage and that the gain of the cutoff point 163 is more than the corresponding threshold. Accordingly, the cutoff point 163 is added for the temperature. As a result, the area outside the area 166-1 is divided into an area 166-2 where the temperature value is more than or equal to the cutoff point 163 and an area 166-3 where the temperature value is less than the cutoff point 163.

Figure 10:
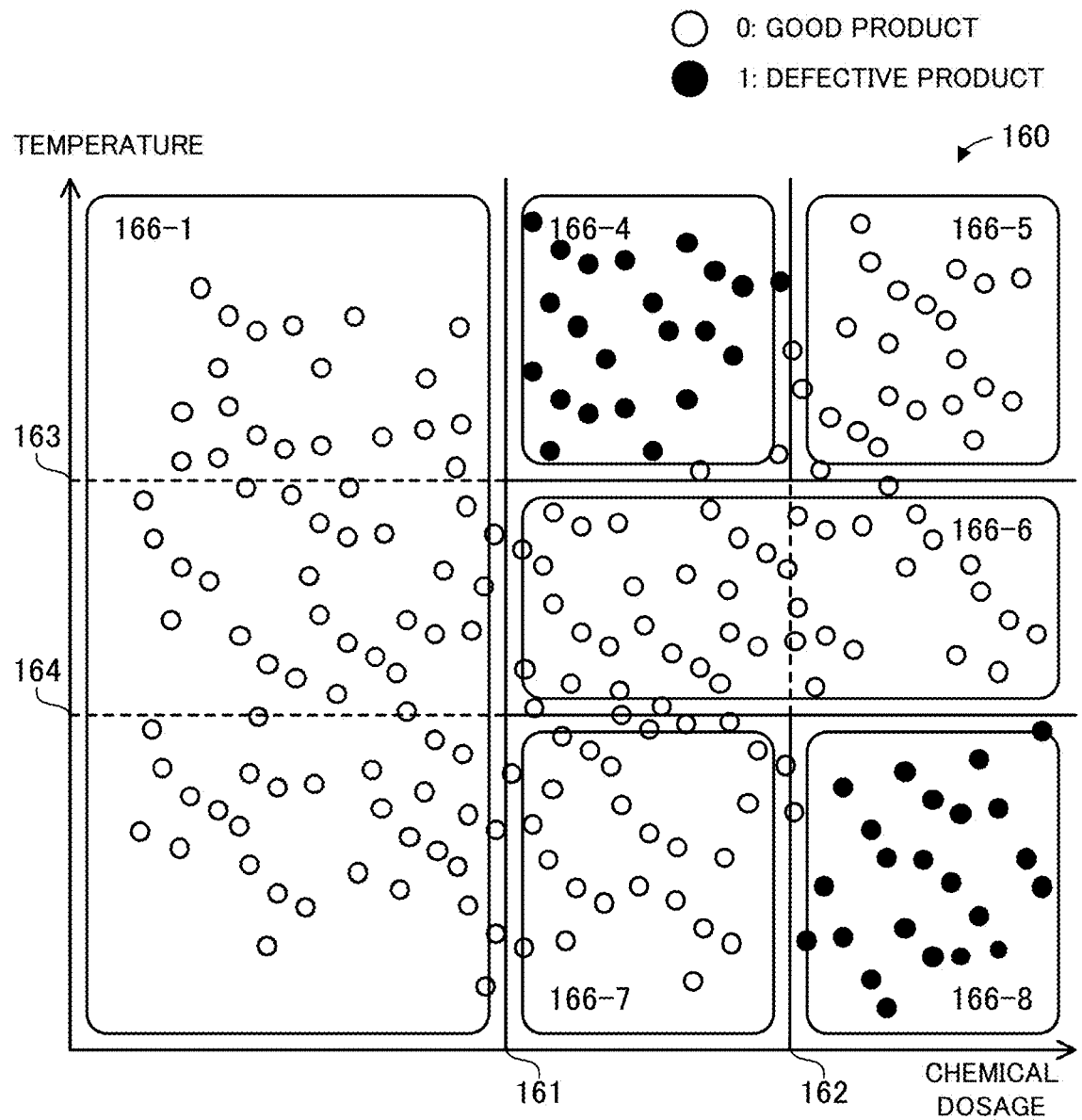
FIG. 10 illustrates the second half of the example of discretization of the plurality of explanatory variables.

FIG. 10 illustrates the second half of the example of discretization of the plurality of explanatory variables.

Next, by focusing on the area 166-3 and using the samples belonging to the area 166-3, a cutoff point achieving the minimum entropy about the chemical dosage is searched for and a cutoff point achieving the minimum entropy about the temperature is searched for. The sample set belonging to the area 166-3 corresponds to the above sample set "all". This example assumes that the entropy of the cutoff point 164 about the temperature is less than that of the cutoff point about the chemical dosage and that the gain of the cutoff point 164 is more than the corresponding threshold. Accordingly, the cutoff point 164 is added for the temperature. As a result, the area 166-3 is divided into an area 166-6 where the temperature value is more than or equal to the cutoff point 164 and an area where the temperature value is less than the cutoff point 164.

Next, by focusing on the area 166-2 and using the samples belonging to the area 166-2, a cutoff point achieving the minimum entropy about the chemical dosage is searched for and a cutoff point achieving the minimum entropy about the temperature is searched for. The sample set belonging to the area 166-2 corresponds to the above sample set "all". This example assumes that the entropy of the cutoff point 162 about the chemical dosage is less than the cutoff point about the temperature and that the gain of the cutoff point 162 is more than the corresponding threshold. Accordingly, the cutoff point 162 is added for the chemical dosage. As a result, the area 166-2 is divided into an area 166-4 where the chemical dosage is less than the cutoff point 162 and an area 166-5 where the chemical dosage is more than or equal to the cutoff point 162.

Likewise, in the area 166-3, the area outside the area 166-6 is divided into an area 166-7 and an area 166-8 by the cutoff point 162. Since most samples indicate "1" as their objective variable value in the areas 166-4 and 166-8, no cutoff point is adopted. Thus, no further division determination is performed on the areas 166-4 and 166-8. In addition, since most samples indicate "0" as their objective variable value in the areas 166-5, 166-6, and 166-7, no cutoff point is adopted. Thus, no further division determination is performed on the areas 166-5, 166-6, and 166-7.

Thus, the discretization is ended. By performing the above discretization, the cutoff points 161 and 162 are set about the chemical dosage, and the cutoff points 163 and 164 are set about the temperature. The range of chemical dosage values is divided into three sections by the cutoff points 161 and 162, and the range of temperature values is divided into three sections by the cutoff points 163 and 164. As a result, for example, the six explanatory variables as illustrated in FIG. 4 are added to the training data.

Next, functions and processing procedures of the machine learning apparatus 100 will be described.

Figure 11:
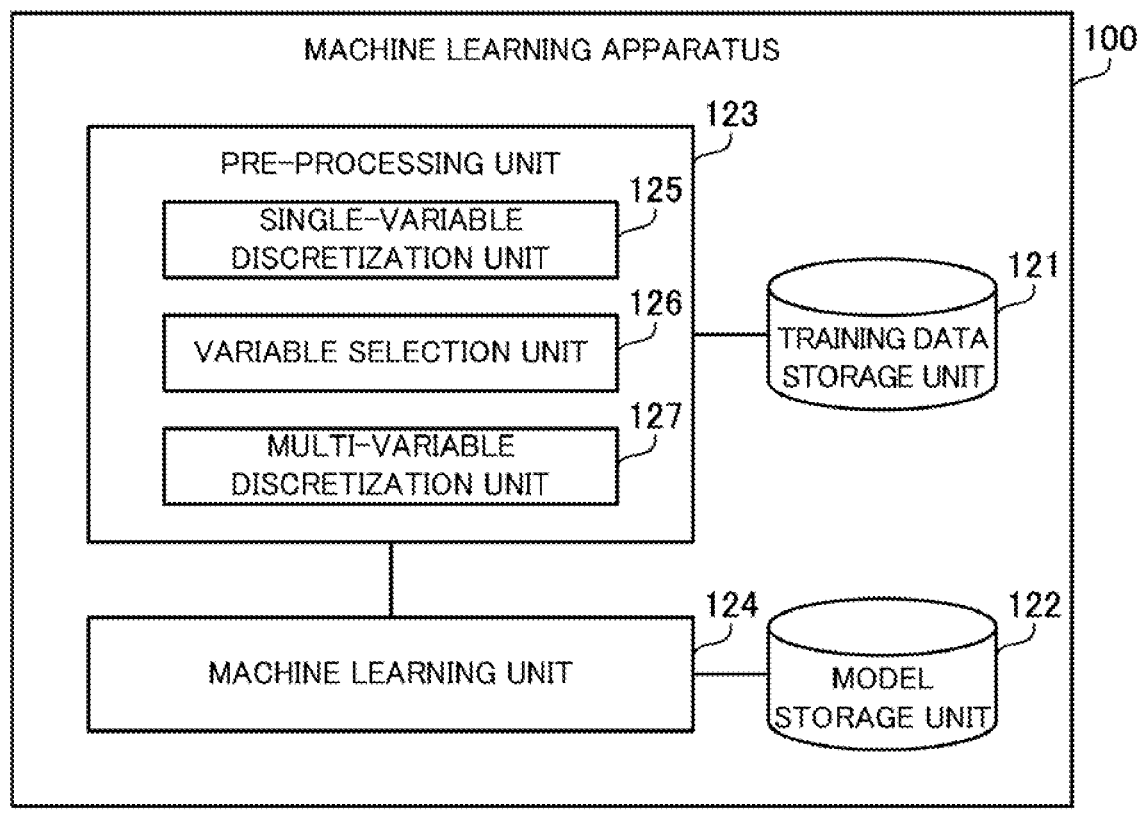
FIG. 11 is a block diagram illustrating a functional example of the machine learning apparatus.

FIG. 11 is a block diagram illustrating a functional example of the machine learning apparatus.

The machine learning apparatus 100 includes a training data storage unit 121, a model storage unit 122, a pre-processing unit 123, and a machine learning unit 124. The training data storage unit 121 and the model storage unit 122 are realized by, for example, storage areas in the RAM 102 or the HDD 103. The pre-processing unit 123 and the machine learning unit 124 are realized by using, for example, programs.

The training data storage unit 121 stores the training data table 131. The model storage unit 122 stores a model trained by Wide Learning™. This model includes a plurality of chunks, each of which indicates a hypothesis in which at least one explanatory variable value and an objective variable value are associated with each other. Each of the plurality of chunks is given an importance level.

The pre-processing unit 123 performs pre-processing on the training data in the training data table 131 stored in the training data storage unit 121 and generates the training data table 132, which indicates the pre-processed training data. The pre-processing unit 123 provides the training data table 132 to the machine learning unit 124. The pre-processing includes discretization of explanatory variable values. The pre-processing unit 123 includes the single-variable discretization unit 125, the variable selection unit 126, and the multi-variable discretization unit 127.

The single-variable discretization unit 125 performs entropy-based discretization of each of the plurality of explanatory variables included in the training data as temporary pre-processing. For example, the single-variable discretization unit 125 adds auxiliary flag-type explanatory variables, which are for indicating whether an original value of an explanatory variable belongs to a certain section, to the training data. The single-variable discretization unit 125 provides the training data, on which per-explanatory-variable discretization has been performed, to the machine learning unit 124. Alternatively, the single-variable discretization unit 125 may provide the original training data to the machine learning unit 124, without performing the temporary pre-processing.

The variable selection unit 126 acquires a temporary model trained based on the training data on which the temporary pre-processing has been performed from the machine learning unit 124. The temporary model includes a plurality of chunks, each of which includes an importance level. Each chunk includes a combination of explanatory variables used for the corresponding hypothesis. The variable selection unit 126 analyzes the temporary model acquired from the machine learning unit 124 and generates the target variable table 137 in which explanatory variable sets that are likely to be important in relation to the objective variable are listed.

The multi-variable discretization unit 127 refers to the target variable table 137 generated by the variable selection unit 126 and performs entropy-based discretization of at least part of the explanatory variables as pre-processing. The training data on which the discretization is performed is the original training data stored in the training data storage unit 121, that is, the training data on which the temporary pre-processing has not been performed.

The multi-variable discretization unit 127 refers to an individual explanatory variable set listed in the target variable table 137 and performs division processing for dividing a multi-dimensional space formed by the individual explanatory variable set. Through this division processing, the multi-variable discretization unit 127 sets at least one cutoff point for each of the two or more explanatory variables included in an individual explanatory variable set and divides the range of values of the individual explanatory variable into two or more sections by the cutoff point. For example, the multi-variable discretization unit 127 adds the auxiliary flag-type explanatory variables, which are for indicating whether an original explanatory variable value belongs to a certain section, to the training data. The multi-variable discretization unit 127 provides the training data, on which discretization has been performed using a plurality of explanatory variables in combination, to the machine learning unit 124.

The machine learning unit 124 performs Wide Learning™ by using the training data acquired from the pre-processing unit 123 and stores the trained model in the model storage unit 122. The machine learning unit 124 may display the trained model on the display device 111 or may transmit the trained model to another information processing apparatus. The machine learning unit 124 acquires the training data on which the temporary pre-processing has been performed from the pre-processing unit 123 or the training data on which pre-processing has not been performed and provides the training result of the above Wide Learning™ on the training data to the pre-processing unit 123 as a temporary training result. Next, the machine learning unit 124 acquires the training data on which the regular pre-processing has been performed from the pre-processing unit 123 and generates a regular training result obtained from the training data.

Figure 12:
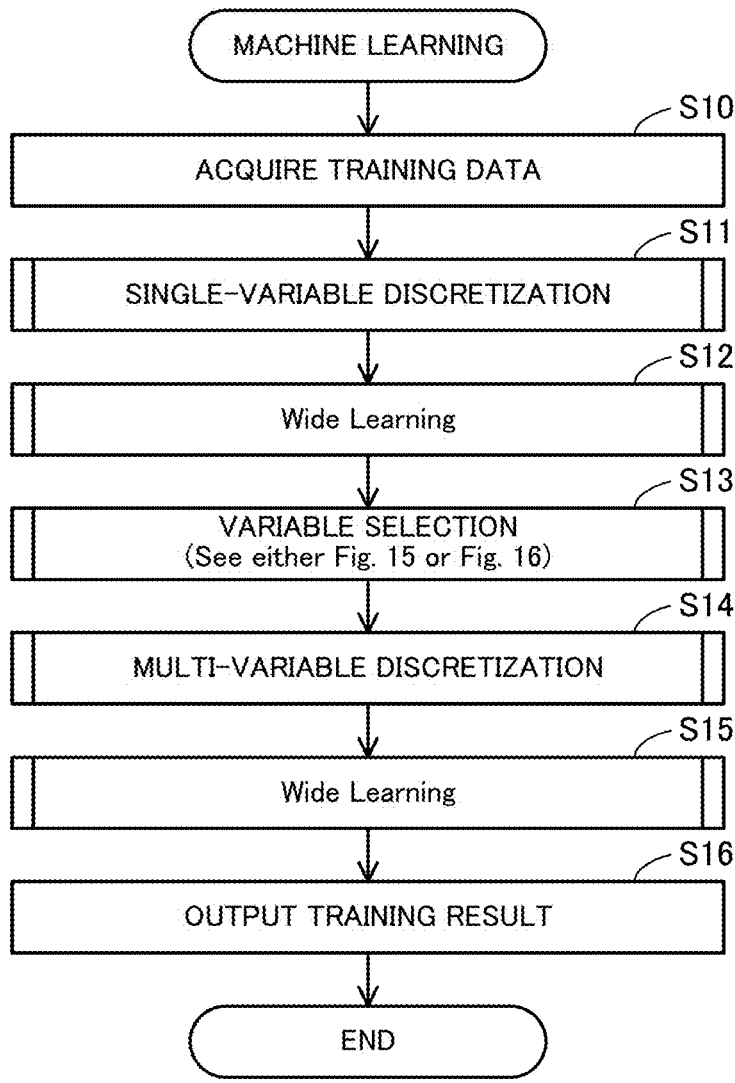
FIG. 12 is a flowchart illustrating an example of a procedure of machine learning.

FIG. 12 is a flowchart illustrating an example of a procedure of machine learning.

(S10) The pre-processing unit 123 acquires training data from the training data storage unit 121.

(S11) The single-variable discretization unit 125 performs single-variable discretization as pre-processing on the training data acquired in step S10. The single-variable discretization will be described in detail below.

(S12) The machine learning unit 124 performs Wide Learning™ by using the training data obtained after the pre-processing in step S11. This Wide Learning™ will be described in detail below.

(S13) The variable selection unit 126 acquires a model trained by Wide Learning™ in step S12. The variable selection unit 126 analyzes the trained model and selects important sets of explanatory variables used as the discretization targets. This variable selection will be described in detail below.

(S14) The multi-variable discretization unit 127 performs multi-variable discretization as pre-processing on the training data acquired in step S10. The multi-variable discretization is performed on the sets of explanatory variables selected in step S13. This multi-variable discretization will be described in detail below.

(S15) The machine learning unit 124 performs the same Wide Learning™ as in step S12, by using the training data on which the pre-processing in step S14 has been performed.

(S16) The machine learning unit 124 outputs the model trained by Wide Learning™ in step S15. For example, the machine learning unit 124 stores the trained model in the model storage unit 122. In addition, for example, the machine learning unit 124 displays the chunks included in the trained model on the display device 111. In addition, for example, the machine learning unit 124 transmits the trained model to another information processing apparatus.

Figure 13:
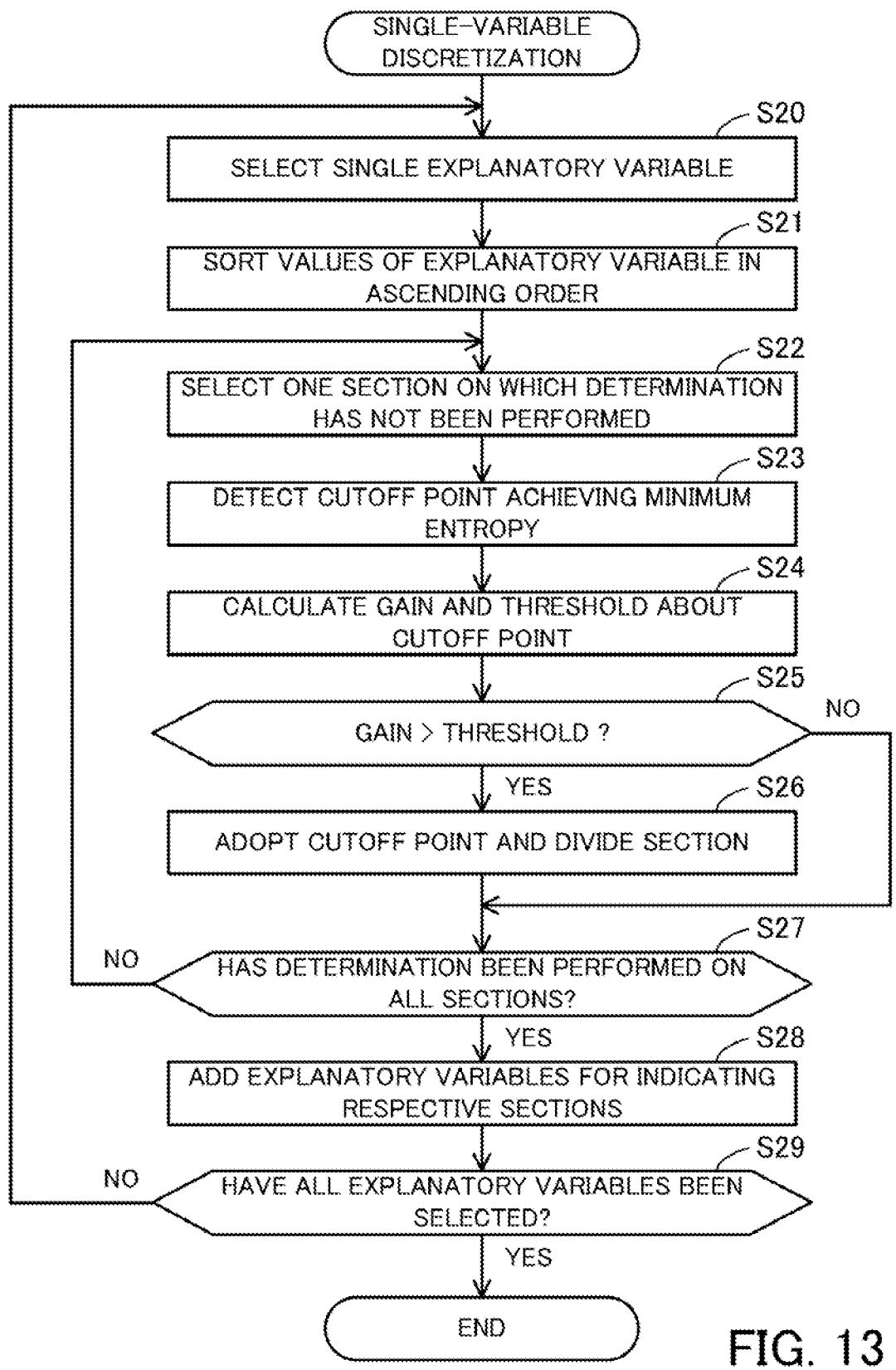
FIG. 13 is a flowchart illustrating an example of a procedure of single-variable discretization.

FIG. 13 is a flowchart illustrating an example of a procedure of single-variable discretization.

The single-variable discretization is performed in the above step S11.

(S20) The single-variable discretization unit 125 selects a single explanatory variable in the training data. This explanatory variable selected is a "continuous value" type explanatory variable, such as an integer or a real number, which has a large number of possible values. The following processing may be omitted if an explanatory variable has a small number of possible values.

(S21) The single-variable discretization unit 125 extracts a value of the explanatory variable selected in step S20 from each of the plurality of samples included in the training data and sorts these explanatory variable values in ascending order.

(S22) The single-variable discretization unit 125 selects a single section on which the determination in the following steps S23 to S26 has not been performed yet in the range from the minimum value to the maximum value of the explanatory variable values sorted in step S21. First, the entire range from the minimum value to the maximum value is considered as the single section. If the range has already been divided, sections obtained by the division are the selection targets.

(S23) The single-variable discretization unit 125 detects a cutoff point achieving the minimum entropy in accordance with mathematical expression (5) in the section selected in step S22.

(S24) The single-variable discretization unit 125 calculates the gain described with mathematical expression (7) and the threshold described with mathematical expression (9) about the cutoff point detected in step S23.

(S25) The single-variable discretization unit 125 determines whether the gain calculated in step S24 is over the threshold calculated in step S24. If the gain is over the threshold, the processing proceeds to step S26. If the gain is less than or equal to the threshold, the processing proceeds to step S27.

(S26) The single-variable discretization unit 125 adopts the cutoff point detected in step S23 and divides the section selected in step S22 into two sections. If the gain is less than or equal to the threshold, the cutoff point is not adopted. That is, the section in step S22 is no longer divided.

(S27) The single-variable discretization unit 125 determines whether the determination in steps S23 to S26 has been performed on all the sections. If the determination has been performed on all the sections, the processing proceeds to step S28. If there is still a section on which the determination has not been performed yet, the processing returns to step S22.

(S28) The single-variable discretization unit 125 determines the sections obtained by the division from the range of values of the explanatory variable selected in step S20. The single-variable discretization unit 125 adds new explanatory variables for indicating whether an individual explanatory variable value belongs to the individual sections to the training data.

(S29) The single-variable discretization unit 125 determines whether all the original explanatory variables included in the original training data have been selected. If all the explanatory variables have been selected, the single-variable discretization ends. If there is still an explanatory variable that has not been selected yet, the processing returns to step S20.

Figure 14:
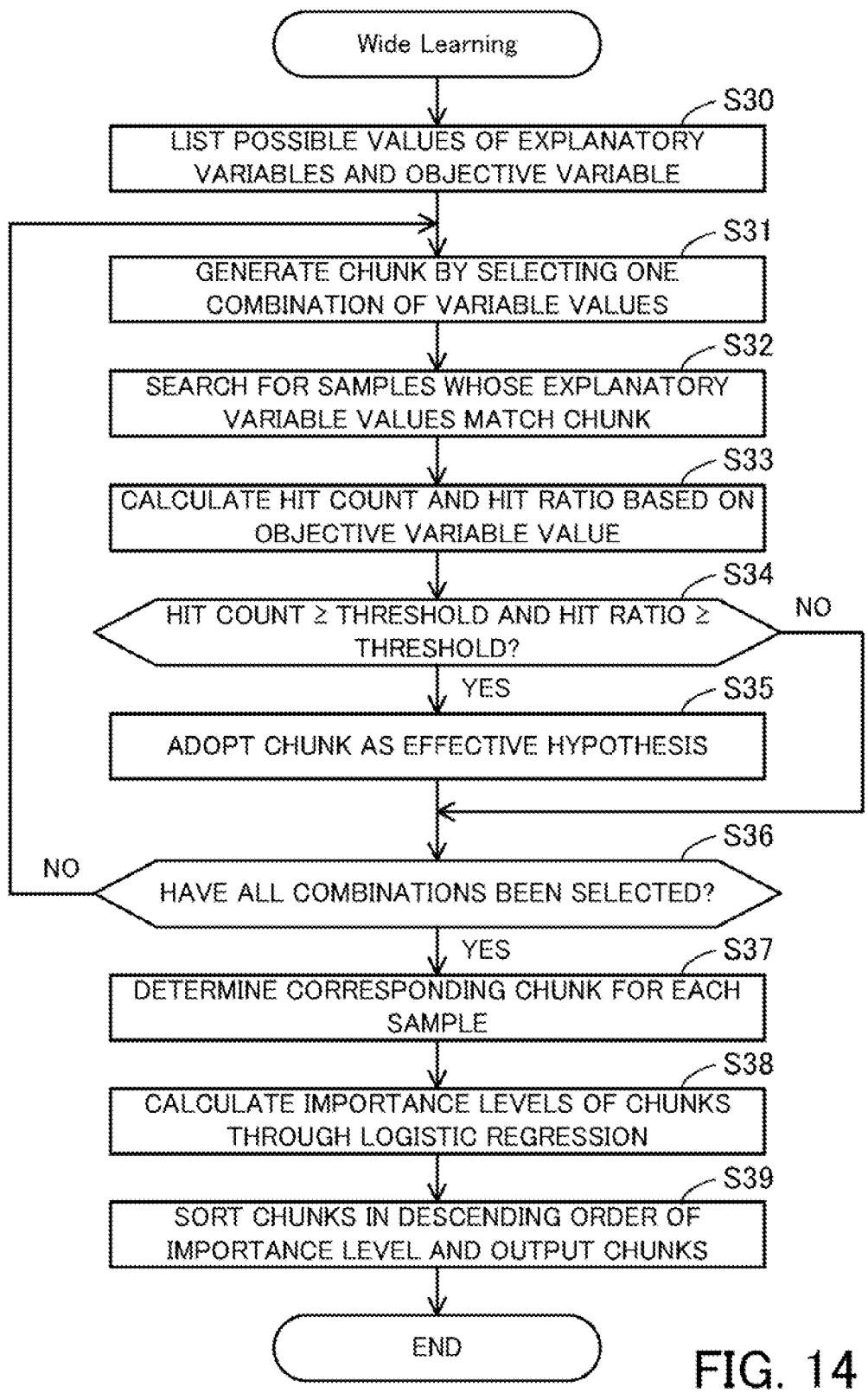
FIG. 14 is a flowchart illustrating an example of a procedure of Wide Learning™.

FIG. 14 is a flowchart illustrating an example of a procedure of Wide Learning™. Wide Learning™ is performed in the above steps S12 and S15.

(S30) The machine learning unit 124 extracts a plurality of explanatory variables and an objective variable from the training data and lists the possible values of the explanatory variables and the objective variable.

(S31) The machine learning unit 124 selects a predetermined number of explanatory variables or less from the plurality of explanatory variables extracted in step S30. The predetermined number, such as 3, is set in advance. The machine learning unit 124 selects one value from each of the one or more explanatory variables selected and selects one value from the objective variable. The machine learning unit 124 generates a chunk indicating a hypothesis that the selected objective variable value is satisfied if the combination of values of one or more explanatory variables selected is satisfied.

(S32) The machine learning unit 124 searches the plurality of samples included in the training data for samples whose explanatory variable values match the chunk generated in step S31.

(S33) The machine learning unit 124 calculates, among the samples found in step S32, the number of samples whose objective variable value matches the chunk generated in step S31, as the hit count. In addition, the machine learning unit 124 counts the number of samples found in step S32 and calculates the ratio of hit counts to this number as the hit ratio.

(S34) The machine learning unit 124 determines whether the hit count calculated in step S33 is more than or equal to a predetermined threshold and determines whether the hit ratio calculated in step S33 is more than or equal to a predetermined threshold. The threshold, such as 10, for the hit count is previously determined, and the threshold, such as 80%, for the hit ratio is previously determined. If the conditions are satisfied, the processing proceeds to step S35. If the conditions are not satisfied, the processing proceeds to step S36. The determination in step S34 may be performed based on either the hit count or the hit ratio.

(S35) The machine learning unit 124 adopts the chunk generated in step S31 as an effective chunk indicating an effective hypothesis.

(S36) The machine learning unit 124 determines whether all the combinations of explanatory variable values and objective variable values have been selected. If all the combinations have been selected, the processing proceeds to step S37. If there is still a combination not selected yet, the processing returns to step S31.

(S37) The machine learning unit 124 determines a corresponding chunk from among effective chunks for each of the relevant samples included in the training data. A corresponding chunk and a corresponding sample have matching explanatory variable values.

(S38) The machine learning unit 124 calculates a weight applied to an individual chunk through logistic regression analysis based on mathematical expressions (1) and (2). The machine learning unit 124 adopts these weights calculated through logistic regression analysis as the importance levels of the individual chunks.

(S39) The machine learning unit 124 sorts the plurality of effective chunks in descending order of the importance level. The machine learning unit 124 adds the importance levels to the chunks and outputs the resultant chunks.

Next, two variable selection methods will be described.

Figure 15:
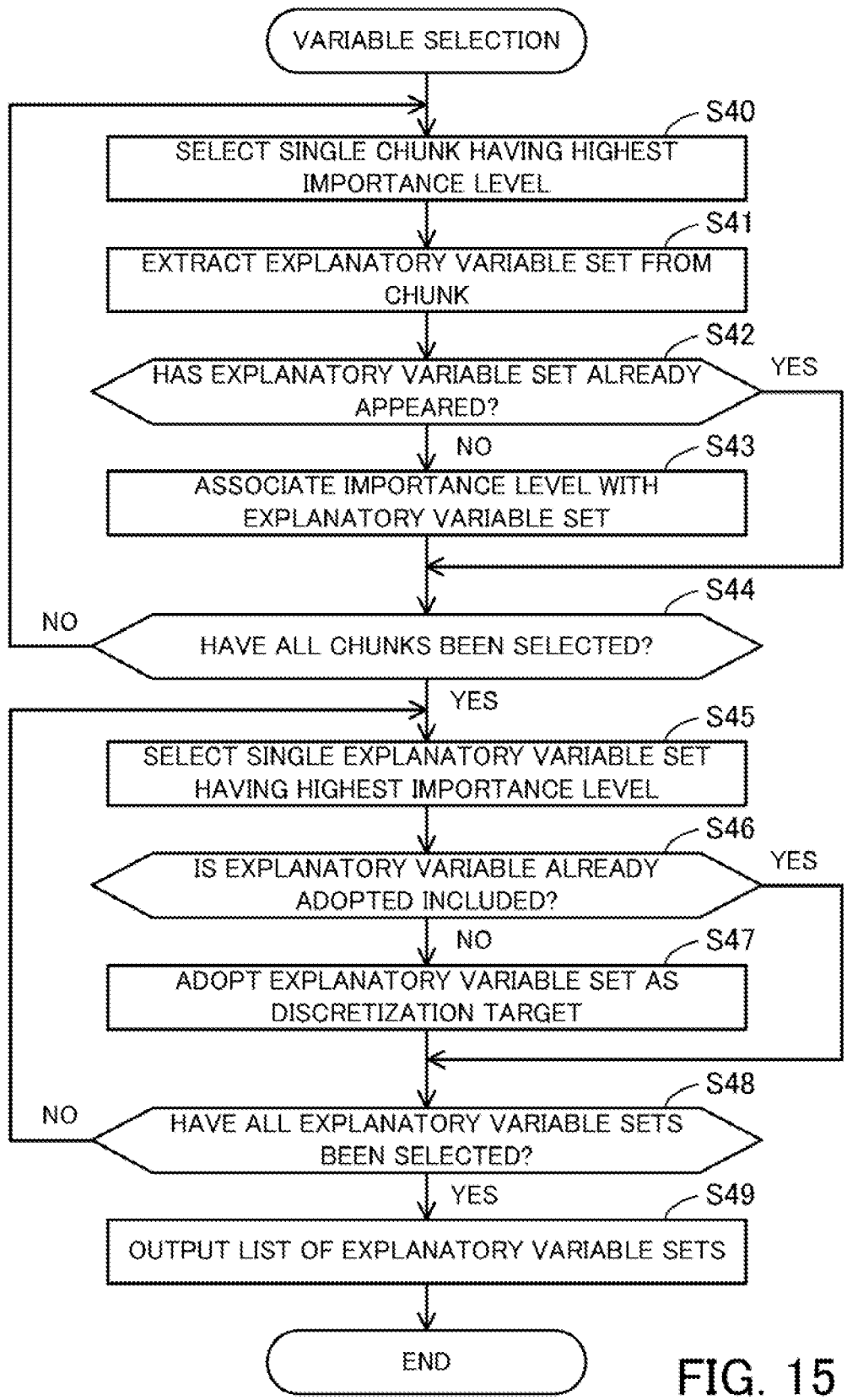
FIG. 15 is a flowchart illustrating an example of a procedure of variable selection.

FIG. 15 is a flowchart illustrating an example of a procedure of variable selection.

This variable selection may be performed in the above step S13.

(S40) The variable selection unit 126 selects a single chunk having the highest importance level from those that have not been selected yet. The chunk selected includes at least two explanatory variables. The following processing may be omitted if a chunk includes only one explanatory variable.

(S41) The variable selection unit 126 extracts a set of explanatory variables appearing in the hypothesis part of the hypothesis from the chunk. The values of the explanatory variables do not need to be extracted.

(S42) The variable selection unit 126 determines whether the explanatory variable set extracted in step S41 has already appeared. If the explanatory variable set has already appeared, the processing proceeds to step S44. Otherwise, the processing proceeds to step S43.

(S43) The variable selection unit 126 associates the importance level of the chunk selected in step S40 with the explanatory variable set extracted in step S41.

(S44) The variable selection unit 126 determines whether all the chunks included in the trained model have been selected. If all the chunks have been selected, the processing proceeds to step S45. If there is still a chunk that has not been selected, the processing returns to step S40.

(S45) The variable selection unit 126 selects a single explanatory variable set having the highest importance level from those that have not been selected yet.

(S46) The variable selection unit 126 determines whether an explanatory variable already adopted as a discretization target is included in the explanatory variable set selected in step S45. If an explanatory variable already adopted is included, the processing proceeds to step S48. Otherwise, the processing proceeds to step S47.

(S47) The variable selection unit 126 adopts the explanatory variable set selected in step S45 as a discretization target to be used for the multi-variable discretization.

(S48) The variable selection unit 126 determines whether all the sets of explanatory variables extracted in steps S40 to S43 have been selected. If all the sets of explanatory variables have been selected, the processing proceeds to step S49. If there is still a set of explanatory variables not selected yet, the processing returns to step S45.

(S49) The variable selection unit 126 generates a list of sets of explanatory variables adopted as the discretization targets in step S47 and outputs the list.

Figure 16:
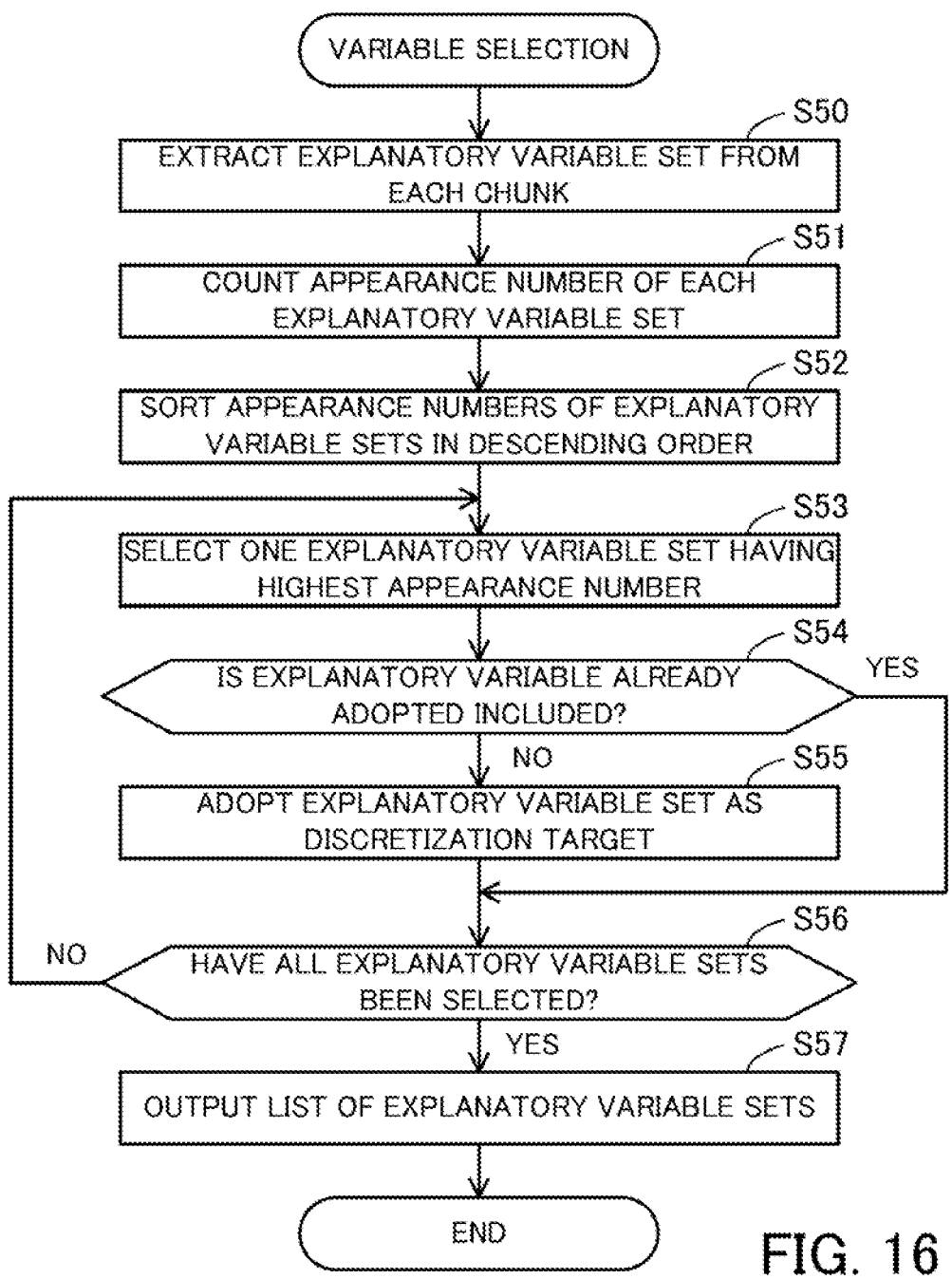
FIG. 16 is a flowchart illustrating another example of the procedure of variable selection.

FIG. 16 is a flowchart illustrating another example of the procedure of variable selection.

This variable selection may be performed in the above step S13. Either the procedure in FIG. 15 or the procedure in FIG. 16 is performed in step S13.

(S50) The variable selection unit 126 extracts, from each of the plurality of chunks included in the trained model, a set of explanatory variables appearing in the hypothesis part of the corresponding hypothesis.

(S51) The variable selection unit 126 aggregates the same explanatory variable sets extracted in step S50 and counts the appearance number per explanatory variable set.

(S52) The variable selection unit 126 sorts the explanatory variable sets in descending order of the appearance number.

(S53) The variable selection unit 126 selects one explanatory variable set having the highest appearance number from those that have not been selected yet.

(S54) The variable selection unit 126 determines whether an explanatory variable already adopted as a discretization target is included in the explanatory variable set selected in step S53. If an explanatory variable already adopted is included, the processing proceeds to step S56. Otherwise, the processing proceeds to step S55.

(S55) The variable selection unit 126 adopts the explanatory variable set selected in step S53 as a discretization target used for the multi-variable discretization.

(S56) The variable selection unit 126 determines whether all the sets of explanatory variables extracted in steps S50 to S52 have been selected. If all the sets of explanatory variables have been selected, the processing proceeds to step S57. If there is still a set of explanatory variables not selected yet, the processing returns to step S53.

(S57) The variable selection unit 126 generates a list of sets of explanatory variables adopted as the discretization targets in step S55 and outputs the list.

In the processing illustrated in FIG. 15 and FIG. 16, the chunks are selected in descending order of the importance level (FIG. 15) or the appearance number (FIG. 16). However, alternatively, based on the hit counts or the hit ratios of the chunks, the chunks may be selected in descending order of the hit count or the hit rate to perform the variable selection.

Verification of the effect of the discretization (pre-processing) described in the second embodiment was conducted in comparison with comparative examples. The conditions used for the verification are as follows. In the following description, the discretization described in the second embodiment will be referred to a proposed technique, as needed.

Two kinds of verification datasets, which are abalone (archive.ics.uci.edu/ml/datasets/Abalone) and wine (archive.ics.uci.edu/ml/datasets/wine), are used.

Two kinds of algorithms, which are random forest (RF) and Wide Learning™ (WL) described in the second embodiment, are used as the machine learning algorithms.

80% of the dataset is used as the dataset for training, and the remaining 20% is used as the dataset for evaluation of the label estimation accuracy.

The dataset for training is also used for determination of the cutoff points in the discretization processing.

75% of the dataset for training is used as the dataset for training in the determination of the cutoff points, and the remaining 25% is used as the dataset for evaluation in the determination of the cutoff points. In the comparative examples, the dataset for evaluation in the determination of the cutoff points is used for cutoff point optimization processing.

First, cutoff points are determined by using the dataset for training (80% of the dataset). Next, the discretization processing based on the determined cutoff points is performed, and the training and the determination are performed, to calculate the determination accuracy.

"abalone" is a dataset in which the genders, sizes, and ages of abalones are associated with each other. In the present verification, whether the individual abalone was 10 years old or older was determined. At the time of the present verification, the dataset "abalone" included a total of 4177 samples consisting of 2081 positive examples and 2096 negative examples.

"wine" is a dataset, and in each sample, data items indicating statuses of wine, such as the percentage of alcohol content of the wine and the sweetness of the wine, are associated with an assessed value of the wine. In the present verification, whether the assessed value of the individual wine was higher than a predetermined amount of money was determined. At the time of the present verification, the dataset "wine" included a total of 1599 samples consisting of 855 positive examples and 744 negative examples.

FIG. 17 illustrates an effect verification result.

A verification result table 171 indicates an effect verification result. In FIG. 17, cut, qcut, mdlp and mmdlpAll indicate the determination accuracies according to the comparative examples, and count_max and weight(abs)_max indicate the determination accuracies according to the proposed technique.

"cut" signifies a technique of dividing the range of values of an explanatory variable into equal intervals. "qcut" signifies a technique of dividing the range of values of an explanatory variable at the same frequency. "mdlp" signifies a technique of performing entropy-based discretization on a single explanatory variable. "mmdlpAll" signifies a technique of performing entropy-based discretization on a combination of a plurality of explanatory variables.

"count_max" signifies the proposed technique described with reference to FIG. 16. "weight(abs)_max" signifies the proposed technique described with reference to FIG. 15.

An individual determination accuracy illustrated in FIG. 17 is a ratio of successful determinations to all the determinations performed on a corresponding evaluation dataset. If a numerical value 1 is indicated as the determination accuracy, this signifies that all determinations are correct. A larger numerical value signifies a higher determination accuracy.

The values under RF signify the determination accuracies obtained by random forest. The values under WL signify the determination accuracies obtained by Wide Learning™.

As illustrated in FIG. 17, it is seen that the determination accuracies obtained when the pre-processing according to the proposed technique is performed are better than any of the accuracies obtained by the techniques as the comparative examples. It is also seen that, even when random forest was used as the machine learning algorithm, the determination accuracies obtained when the pre-processing according to the proposed technique is performed are better than most of the accuracies obtained by the techniques as the comparative examples. Thus, it is seen that effectiveness of the pre-processing according to the proposed techniques is not limited to only the case where the machine learning algorithm is Wide Learning™.

Figure 18:
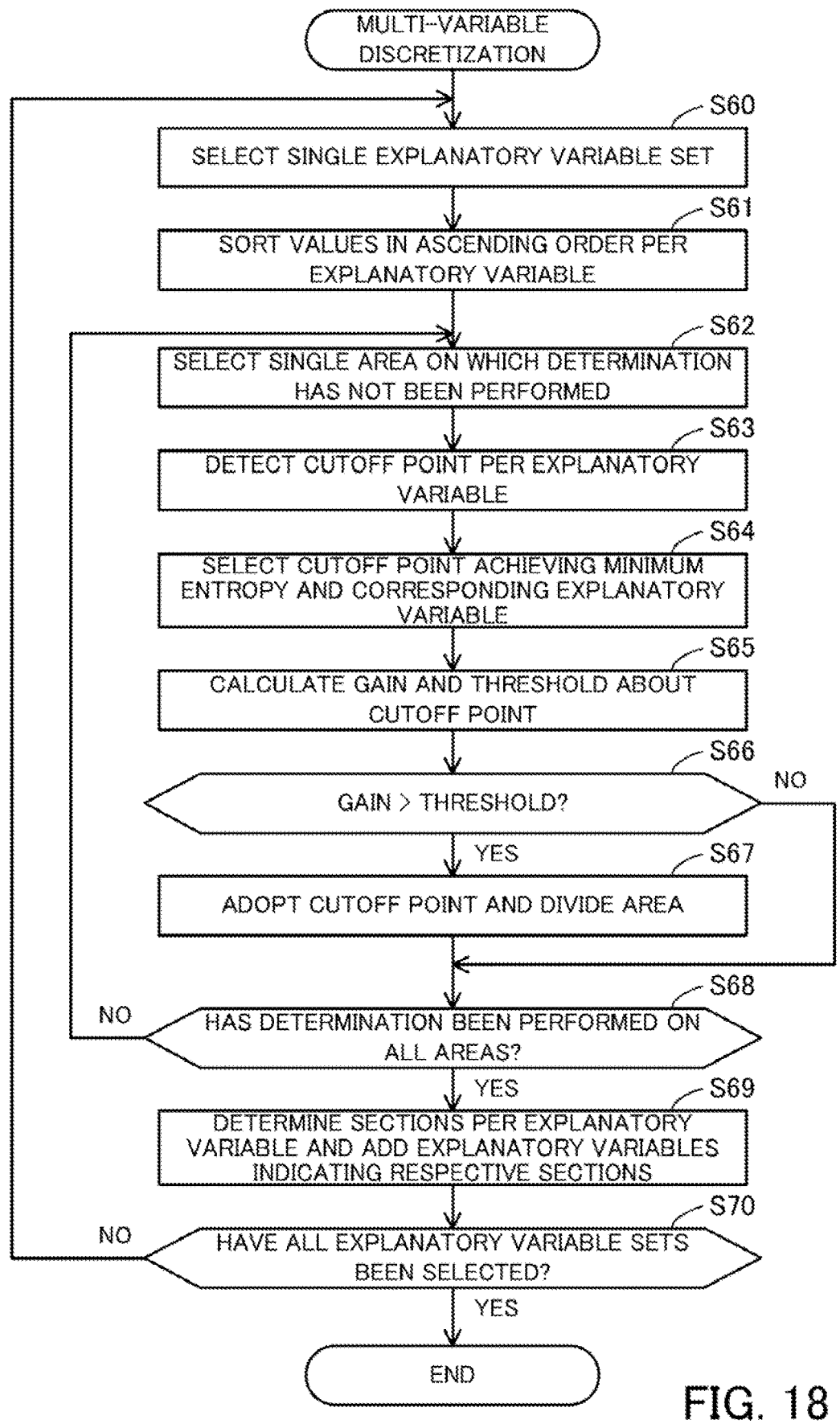
FIG. 18 is a flowchart illustrating an example of a procedure of multi-variable discretization.

FIG. 18 is a flowchart illustrating an example of a procedure of multi-variable discretization.

The multi-variable discretization is performed in the above step S14.

(S60) The multi-variable discretization unit 127 selects a single explanatory variable set from the explanatory variable sets adopted as the discretization targets by the variable selection unit 126.

(S61) The multi-variable discretization unit 127 extracts the explanatory variable values in the explanatory variable set selected in step S60 from each of the plurality of samples included in the training data. The multi-variable discretization unit 127 sorts the values in ascending order per explanatory variable.

(S62) The multi-variable discretization unit 127 determines, per explanatory variable, a range from the minimum value to the maximum value sorted in step S61 and determines a multi-dimensional space formed by the explanatory variable set selected in step S60. The multi-variable discretization unit 127 selects a single area, on which the following determination from steps S63 to S67 has not been performed yet, in the multi-dimensional space. At first, the entire multi-dimensional space formed by the explanatory variable set is considered as the single area. If the multi-dimensional space has already been divided into areas, the single area is selected from these divided areas.

(S63) The multi-variable discretization unit 127 determines a section per explanatory variable, as the range of the area selected in step S62. The multi-variable discretization unit 127 detects a cutoff point achieving the minimum entropy in the corresponding section per explanatory variable in accordance with mathematical expression (5).

(S64) The multi-variable discretization unit 127 selects, from the cutoff points of the explanatory variables detected in step S63, a cutoff point achieving the minimum entropy in accordance with mathematical expression (5). In addition, the multi-variable discretization unit 127 selects an explanatory variable to which this cutoff point belongs.

(S65) The multi-variable discretization unit 127 calculates, about the cutoff point selected in step S64, the gain in accordance with mathematical expression (7) and the threshold in accordance with mathematical expression (9).

(S66) The multi-variable discretization unit 127 determines whether the gain calculated in step S65 is over the threshold calculated in step S65. If the gain is over the threshold, the processing proceeds to step S67. If the gain is less than or equal to the threshold, the processing proceeds to step S68.

(S67) The multi-variable discretization unit 127 adopts the cutoff point selected in step S64 and divides the area selected in step S62 into two areas. If the gain is less than or equal to the threshold, the multi-variable discretization unit 127 does not adopt the cutoff point and does not further divide the area selected in step S62.

(S68) The multi-variable discretization unit 127 determines whether the determination from steps S63 to S67 has been performed on all the areas. If the determination has been performed on all the areas, the processing proceeds to step S69. If there is still an area on which the determination has not been performed yet, the processing returns to step S62.

(S69) The multi-variable discretization unit 127 determines, per explanatory variable, the sections obtained by the division. The multi-variable discretization unit 127 adds, per explanatory variable, new explanatory variables to the training data. The new explanatory variables indicate whether an individual explanatory variable value belongs to the individual sections.

(S70) The multi-variable discretization unit 127 determines whether all the original explanatory variable sets included in the original training data have been selected. If all the explanatory variable sets have been selected, the multi-variable discretization is ended. If there is still an explanatory variable set that has not been selected yet, the processing returns to step S60.

The machine learning apparatus 100 according to the second embodiment performs temporary machine learning on training data on which pre-processing has simply been performed or training data on which the pre-processing has not been performed. A model trained by this temporary machine learning is analyzed, and important sets of explanatory variables strongly relating to an objective variable are determined. Next, only on the important sets of explanatory variables, discretization as pre-processing for detecting cutoff points and setting sections for the values of the explanatory variables is performed. Next, machine learning is performed on the training data on which the pre-processing has been performed.

When Wide Learning™ is used as the machine learning algorithm, a model indicating hypotheses understandable by people is generated, and the grounds for a prediction result of the model are easily checked. Thus, the people are able to accept the prediction result easily. In addition, since the discretization of explanatory variables is performed as the pre-processing, overfitting occurs less compared with a case where the discretization is not performed. As a result, a model having a higher versatility is trained. In addition, since entropy-based discretization is performed, sections for the values of explanatory variables are set in view of a distribution of values of an objective variable. Thus, borders where the values of the objective variable change are easily detected, and the accuracy of the trained model is improved.

In addition, since two or more explanatory variables are combined and discretized, a distribution of values of an objective variable is taken into consideration on a multi-dimensional space. Thus, compared with a case where the discretization is performed per explanatory variable, the risk of missing important cutoff points becomes less. In addition, since the discretization is performed on only the important sets of explanatory variables, compared with a case where the discretization is performed comprehensively on various sets of explanatory variables, the load on the pre-processing and the machine learning becomes less. In addition, since the range of explanatory variable values is prevented from being divided into an excessively large number of sections, overfitting is prevented, and the model accuracy is improved. In addition, since the explanatory variable sets are selected based on the training result of the temporary machine learning, the risk of missing important cutoff points that affect the model accuracy is reduced.

In one aspect, training data is discretized in a way to improve the model accuracy.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable recording medium storing therein a computer program that causes a computer to execute a process comprising:

discretizing, with respect to a plurality of training data records, each of which is data in which a combination of data item values of a plurality of data items is associated with label information, the data item values based on a criterion per data item to convert the data item values into discretized data values, the data item values being measured for a manufactured product by using sensor devices, the label information indicating whether the manufactured product is defective;

performing training processing for training a model that receives the discretized data values of the plurality of data items as input and performs determination about the label information by using a plurality of training data records obtained by conversion, the model being configured to detect defective products from a manufacturing line;

acquiring, from an execution result of the training processing, a plurality of feature data records, each of which differently indicates a combination of two or more data items used for the determination among the plurality of data items and a plurality of index values, each of which indicates an importance level of an individual one of the plurality of feature data records; and selecting at least one feature data record of the plurality of feature data records based on the plurality of index values and changing, based on the combination indicated by the selected at least one feature data record, the criterion used for each of the two or more data items included in the combination indicated by the selected at least one feature data record.

2. The non-transitory computer-readable recording medium according to claim 1, wherein the discretizing of the data item values of a single data item includes dividing a range of possible data item values of the single data item into two or more sections, and the changing of the criterion includes calculating a multi-dimensional distribution of the data item values with respect to the combination indicated by the selected at least one feature data record, and changing the two or more sections of each of the two or more data items based on the multi-dimensional distribution calculated.

3. The non-transitory computer-readable recording medium according to claim 2, wherein the changing of the two or more sections includes dividing the multi-dimensional distribution into a plurality of areas based on density of training data records having same label information and determining, based on a border of the plurality of areas, cutoff points for a range of possible data item values of each of the two or more data items.

4. The non-transitory computer-readable recording medium according to claim 1, wherein the model includes a plurality of determination rules, each of which includes a condition about the discretized data values that is satisfied by part of the plurality of data items and an estimated value of the label information, the condition and the estimated value being associated with each other, and the plurality of index values, each of which indicates an importance level of a corresponding one of the plurality of determination rules, and the plurality of feature data records is acquired by extracting the part of the plurality of data items used in the condition from the plurality of determination rules included in the model.

5. The non-transitory computer-readable recording medium according to claim 1, wherein the changing of the criterion includes selecting the at least one feature data record such that a number of feature data records including a same data item is less than or equal to a threshold in the at least one feature data record.

6. The non-transitory computer-readable recording medium according to claim 1, wherein the process further includes:

discretizing the data item values per data item based on the criterion obtained by the changing to convert the data item values into other discretized data values, performing the training processing by using a plurality of training data records obtained by re-conversion, and outputting the model trained.

7. A machine learning method comprising:

discretizing, by a processor, with respect to a plurality of training data records, each of which is data in which a combination of data item values of a plurality of data items is associated with label information, the data item values based on a criterion per data item to convert the data item values into discretized data values, the data item values being measured for a manufactured product by using sensor devices, the label information indicating whether the manufactured product is defective;

performing, by the processor, training processing for training a model that receives the discretized data values of the plurality of data items as input and performs determination about the label information by using a plurality of training data records obtained by conversion, the model being configured to detect defective products from a manufacturing line;

acquiring, by the processor, from an execution result of the training processing, a plurality of feature data records, each of which differently indicates a combination of two or more data items used for the determination among the plurality of data items and a plurality of index values, each of which indicates an importance level of an individual one of the plurality of feature data records; and selecting, by the processor, at least one feature data record of the plurality of feature data records based on the plurality of index values and changing, based on the combination indicated by the selected at least one feature data record, the criterion used for each of the two or more data items included in the combination indicated by the selected at least one feature data record.

8. A machine learning apparatus comprising:

a memory configured to store a plurality of training data records, each of which is data in which a combination of data item values of a plurality of data items is associated with label information, the data item values being measured for a manufactured product by using sensor devices, the label information indicating whether the manufactured product is defective; and a processor configured to execute a process including discretizing, with respect to the plurality of training data records, the data item values based on a criterion per data item to convert the data item values into discretized data values, performing training processing for training a model that receives the discretized data values of the plurality of data items as input and performs determination about the label information by using a plurality of training data records obtained by conversion, the model being configured to detect defective products from a manufacturing line, acquiring, from an execution result of the training processing, a plurality of feature data records, each of which differently indicates a combination of two or more data items used for the determination among the plurality of data items and a plurality of index values, each of which indicates an importance level of an individual one of the plurality of feature data records, and selecting at least one feature data record of the plurality of feature data records based on the plurality of index values, and changing, based on the combination indicated by the selected at least one feature data record, the criterion used for each of the two or more data items included in the combination indicated by the selected at least one feature data record.

* * * * *